US012626696B2

(12) United States Patent
Iyengar et al.

(10) Patent No.: US 12,626,696 B2
(45) Date of Patent: May 12, 2026

(54) SYSTEM AND METHOD FOR GENERATING A CLOSED DOMAIN CONVERSATION

(71) Applicant: RN CHIDAKASHI TECHNOLOGIES PRIVATE LIMITED, Mumbai (IN)

(72) Inventors: Prashant Iyengar, Mumbai (IN); Hardik Godara, Jodhpur (IN)

(73) Assignee: RN CHIDAKASHI TECHNOLOGIES PRIVATE LIMITED, Mumbai (IN)

( * ) Notice: Subject to any disclaimer, the term of this patent is extended or adjusted under 35 U.S.C. 154(b) by 269 days.

(21) Appl. No.: 18/283,762

(22) PCT Filed: Mar. 23, 2022

(86) PCT No.: PCT/IN2022/050285
§ 371 (c)(1),
(2) Date: Sep. 22, 2023

(87) PCT Pub. No.: WO2022/201193
PCT Pub. Date: Sep. 29, 2022

(65) Prior Publication Data
US 2024/0169984 A1     May 23, 2024

(30) Foreign Application Priority Data

Mar. 24, 2021     (IN) ............................. 202121012884

(51) Int. Cl.
*G10L 15/22*          (2006.01)
*G10L 15/18*          (2013.01)
*G10L 17/00*          (2013.01)

(52) U.S. Cl.
CPC .......... *G10L 15/22* (2013.01); *G10L 15/1822* (2013.01); *G10L 17/00* (2013.01)

(58) Field of Classification Search
USPC ......................... 704/246, 247, 251, 252, 275
See application file for complete search history.

(56) References Cited

U.S. PATENT DOCUMENTS

| 10,629,191 | B1 * | 4/2020 | Cheng | G06F 40/205 |
| 11,194,973 | B1 * | 12/2021 | Goel | G06N 3/08 |
| 2018/0133900 | A1 * | 5/2018 | Breazeal | B25J 19/026 |
| 2019/0236085 | A1 * | 8/2019 | Galitsky | G06F 16/322 |
| 2020/0117858 | A1 * | 4/2020 | Freeman | G06F 40/117 |
| 2020/0286463 | A1 * | 9/2020 | Galitsky | G06F 16/35 |
| 2021/0141818 | A1 * | 5/2021 | Wu | G06F 16/3329 |

* cited by examiner

*Primary Examiner* — Leonard Saint-Cyr

(57) ABSTRACT

An embodiment herein provides a system and a method for generating a closed domain conversation with a user (102) in real-time based on user's interest. The system includes a robot (104) including a memory (110) that includes one or more instructions and a processor (112) that executes the one or more instructions. The processor (112) is configured to initiate a conversation with the user (102) which is a machine-initiated conversation, determine a flow of the conversation with the user (102) by analyzing replies of the user (102), generate the closed domain conversation by providing one or more contents related to at least one topic or category which is personalized based on a combination of one or more properties of the user's interest, and enable the user (102) to interact with the robot (104) using the closed domain conversation in real-time based on the user's interest.

8 Claims, 19 Drawing Sheets

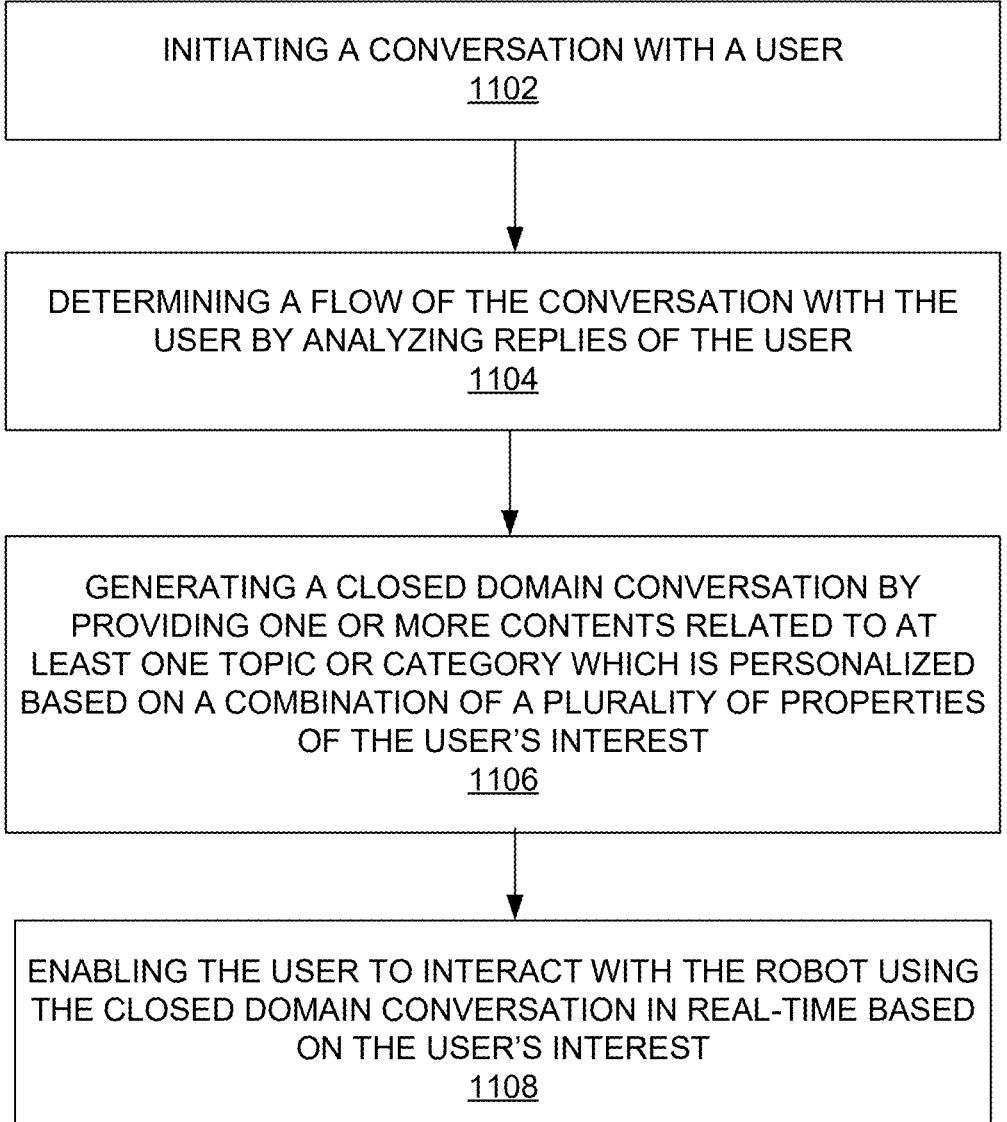

INITIATING A CONVERSATION WITH A USER
1102

DETERMINING A FLOW OF THE CONVERSATION WITH THE
USER BY ANALYZING REPLIES OF THE USER
1104

GENERATING A CLOSED DOMAIN CONVERSATION BY
PROVIDING ONE OR MORE CONTENTS RELATED TO AT
LEAST ONE TOPIC OR CATEGORY WHICH IS PERSONALIZED
BASED ON A COMBINATION OF A PLURALITY OF PROPERTIES
OF THE USER'S INTEREST
1106

ENABLING THE USER TO INTERACT WITH THE ROBOT USING
THE CLOSED DOMAIN CONVERSATION IN REAL-TIME BASED
ON THE USER'S INTEREST
1108

FIG. 11

SYSTEM AND METHOD FOR GENERATING A CLOSED DOMAIN CONVERSATION

BACKGROUND

Technical Field

Embodiments of this disclosure generally relate to a closed domain conversation, and more particularly, to a system and a method for generating the closed domain conversation with a user in real-time based on user's interest.

Description of the Related Art

Closed domain conversation is a type of conversation that allows a user to interact with a plurality of applications, a plurality of websites, and a plurality of devices, etc. via text, voice, audio, video, etc. The closed domain conversation uses a plurality of technologies to process and contextualize user input to respond to the user. Nowadays, the closed domain conversation has been used for businesses in order to create personalized customer experiences. Companies continue to develop a variety of closed domain conversations to interact with customers. Though a variety of closed domain conversation emerges day by day, more research are still going on to develop the closed domain conversation that enables fastest user interaction which in turn improves the user's conversational experience.

An architecture for the closed domain conversation includes a plurality of nodes that illustrates execution steps of operations and edges that illustrates corresponding interconnections between the nodes. Conventional architecture for the closed domain conversation consumes more time in terms of computer resource processing and the response time for the user input is high. Thus, the conventional architecture for closed domain conversation may impede the functioning of a computing device that is used for a conversational purpose. Further, the existing architecture for closed domain conversation is most complex in terms of design and does not support to continue any form of user-initiated conversation or machine-initiated conversation. Further, the existing system does not continue the conversation with a new topic which are liked by the user and the existing system does not continue the conversation based on interesting facts. Further, the existing system does not move to the next conversation if the user won't like the topic and does not continue the chat with the user interestingly.

Further, the existing system does not continue the conversation based on the user interest or does not change the topic based on the user interest. Existing closed domain conversation requires different conversational architecture for supporting different input modalities which in turn takes up more computational resources and increases the complexity of implementation. Hence, the existing closed domain conversation system supports only limited input topics. Still, research is going on for the closed domain conversation that is capable of supporting any topics initiated by the user or the machine.

Accordingly, there remains a need for a system for generating the closed domain conversation that is capable of continuing the conversation with the user in real-time based on the user's interest and supporting any form of user-initiated conversation.

SUMMARY

An embodiment herein provides a system for generating a closed domain conversation with a user in real-time based on user's interest. The system includes a robot including a memory and a processor. The memory includes one or more instructions and the processor executes the one or more instructions. The processor is configured to initiate a conversation with the user. The conversation includes a machine-initiated conversation. The processor is configured to determine a flow of the conversation with the user by analyzing replies of the user. The processor determines and redirects the flow of the conversation with any of an input query or one or more parameters extracted from the input query, entity or sentiments, a location of the user, or environmental factors from the replies of the user. The processor is configured to generate the closed domain conversation by providing one or more contents related to at least one topic or category which is personalized based on a combination of one or more properties of the user's interest. The processor is configured to enable the user to interact with the robot using the closed domain conversation in real-time based on the user's interest.

In some embodiments, the processor is configured to generate one or more opinion sets by analyzing the replies of the user during the conversation. The processor determines the user's interest based on at least one of the user preferences, likes, and dislikes of the user, wherein the one or more opinion sets enables the robot to update the user's interest and the user preferences.

In some embodiments, the processor is configured to determine and redirect the flow of conversation with user sentiments by analyzing the replies of the user, and generate the closed domain conversation by filtering the conversation with the one or more contents.

In some embodiments, the conversation includes one or more micro conversations pre-determined in the memory. The processor is configured to clear a conversation history in the one or more micro conversations when the conversation is not based on the user's interest, automatically switch the conversation from one topic to another topic based on at least one of the user preferences, the likes and the dislikes of the user, and initiate a new conversation.

In some embodiments, the robot includes an audio input unit that captures an audio input of the user, a video input unit that captures a video input of the user, an audio output unit that outputs an audio output of the robot, an expression output unit that outputs one or more expressions of the robot, and a robot control system that controls a movement of the robot by analyzing the audio output and the one or more expressions of the robot.

In some embodiments, the processor is configured to receive an input conversation from the user. The input conversation is a user-initiated conversation. The processor is configured to recognize a voice of the user to identify the user, and automatically initiate the conversation with the user by analyzing the input conversation.

In some embodiments, the processor is configured to control the flow of the conversation in at least one of sequential order or random order. The sequential order includes a greeting message, a main conversation body, an end message, or a goodbye message which are connected in the sequential order. The random order comprises the greeting message, the main conversation body, the end message, or the goodbye message which are connected in the random order that selects the flow of the conversation randomly to generate a different flow of conversation.

In some embodiments, the one or more of properties of the user's interest comprises any of, but not limited to, an age, a location, a gender, likes, dislikes, a category of conversation, and a subcategory of conversation, of the user.

In an aspect, a method for generating a closed domain conversation with a user in real-time based on user's interest is provided. The method includes initiating a conversation with the user. The conversation includes a machine-initiated conversation. The method includes determining a flow of the conversation with the user by analyzing replies of the user. The processor determines and redirects the flow of the conversation with any of an input query or one or more parameters extracted from the input query, entity or sentiments, a location of the user, or environmental factors from the replies of the user. The method includes generating the closed domain conversation by providing one or more contents related to at least one topic or category which is personalized based on a combination of one or more properties of the user's interest. The method includes enabling the user to interact with the robot using the closed domain conversation in real-time based on the user's interest.

In some embodiments, the method includes receiving an input conversation from the user. The input conversation is a user-initiated conversation. The method includes recognizing a voice of the user to identify the user, and automatically initiating the conversation with the user by analyzing the input conversation.

The system and the method respond to the user-initiated conversation quickly, and generate the closed domain conversations specifically based on the user's interest. This may improve the relationship with the user. Each conversation with the user may be updated in the server that enables the improved generation of the closed domain conversations on any topics based on the previous conversations. The robot is configured to change the conversation from one to another if the conversation is not interested in the user.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 11 illustrates a method of generating a closed domain conversation with a user in real-time based on the user's interest according to some embodiments herein.

DETAILED DESCRIPTION OF PREFERRED EMBODIMENTS

Figure 1:
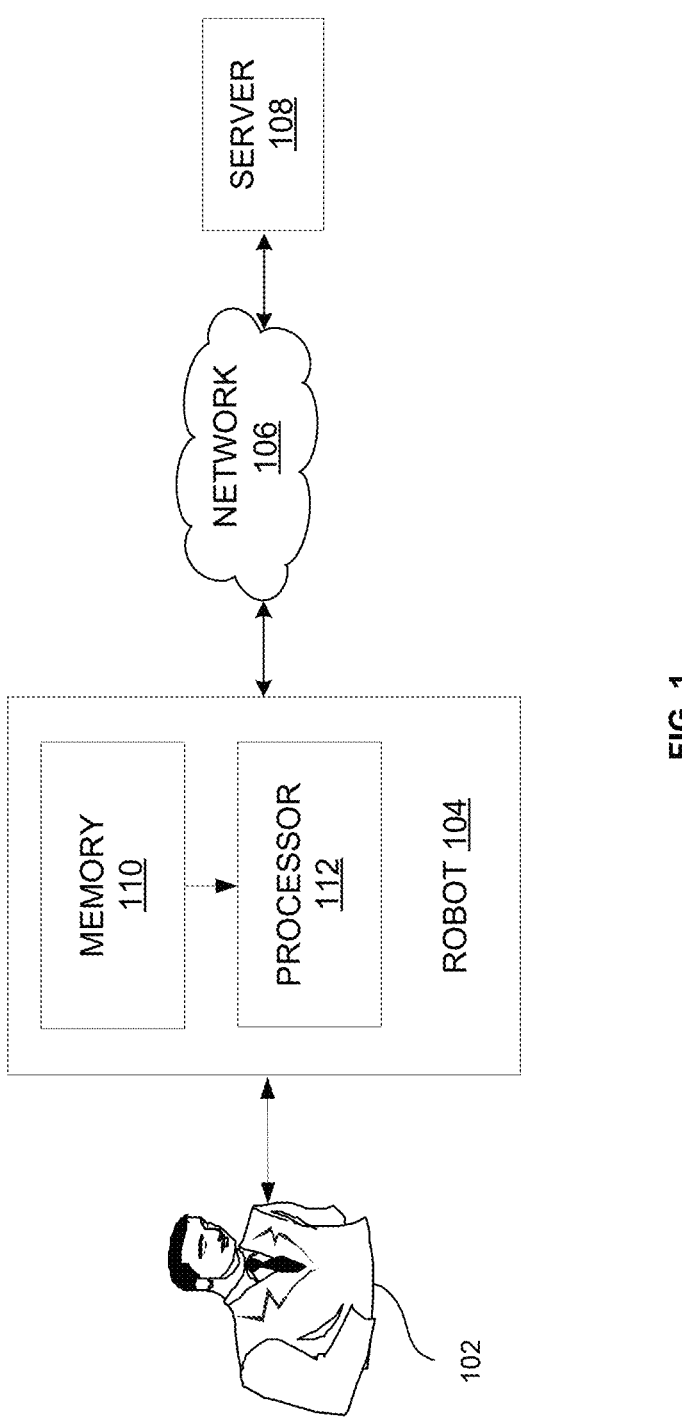
FIG. 1 illustrates a schematic diagram of a system for generating a closed domain conversation with a user in real-time based on user's interest according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and a method for generating a closed domain conversation with a user in real-time based on user's interest. Referring now to the drawings, and more particularly to FIGS. 1 through 11, where similar reference characters denote corresponding features consistently throughout the figures, there are shown preferred embodiments.

FIG. 1 illustrates a schematic diagram of a system for generating a closed domain conversation with a user 102 in real-time based on user's interest according to some embodiments herein. The schematic diagram includes the user 102, a robot 104, a network 106, and a server 108. The robot 104 is communicatively connected with the server 108 through the network 106 to obtain information from the server 108. The network 106 may be a wired network or a wireless network. In some embodiments, the network 106 is a combination of the wired network and the wireless network. The robot 104 includes a memory 110 and a processor 112. The memory 110 includes one or more instructions and the processor 112 executes the one or more instructions. The one or more instructions may be the instructions for generating the closed domain conversation. The processor 112 is configured to initiate a conversation with the user 102. The conversation may be a machine-initiated conversation. In some embodiments, the conversation includes one or more micro conversations that are pre-determined in the memory 110. A micro conversation in the one or more micro conversations may be a smallest unit of conversation and the one or more micro conversations may be networked together to form a larger conversation. In some embodiments, a conversation network can be created by networking micro conversations or smaller conversations with the user 102. The conversation network may be stored in the server 108.

The processor 112 is configured to determine a flow of the conversation with the user 102 by analyzing replies of the user 102. The processor 112 may determine and redirect the flow of the conversation with any of an input query, one or more parameters extracted from the input query, entity or sentiments, a location of the user 102, or environmental factors from the replies of the user 102. In some embodiments, the input query is a user-initiated conversation. The processor 112 is configured to generate the closed domain conversation by providing one or more contents related to at least one topic or category which is personalized based on a combination of one or more properties of the user's interest. The one or more properties of the user's interest may include any of, but not limited to, an age, a location, a gender, likes, dislikes, a category of conversation, and a subcategory of conversation, of the user. For example, when the user 102 is an actor, the processor 112 is configured to initiate the conversation on a topic or category based on movies, cine-news, gossips, and the like.

The processor 112 is configured to enable the user 102 to interact with the robot 104 using the closed domain conversation in real-time based on the user's interest. The user's interest may be based on at least one of user preferences, likes and dislikes of the user 102. In some embodiments, the processor 112 is configured to receive an input conversation from the user 102. The input conversation may be the user-initiated conversation. The processor 112 is configured to recognize a voice of the user 102 to identify the user 102, and automatically initiate the conversation with the user 102 by analyzing the input conversation.

In some embodiments, the robot 104 includes an Artificial Intelligence (AI) module to generate the closed domain conversation. The AI module may be a machine learning model for generating the closed domain conversation with the user 102. In some embodiments, the AI module is configured to predict the user's interest based on at least one of the user preferences, the likes, and dislikes of the user 102. In some embodiments, the AI module predicts the user's interest based on a user interested category or a user interested topic. The AI module may initiate the conversation with the user 102 on a topic automatically based on the user's interest.

In some embodiments, the robot 104 includes an audio input unit, a video input unit, an audio output unit, an expression output unit, and a robot control system. The audio input unit is configured to capture an audio input of the user 102. The video input unit is configured to capture a video input of the user 102. The audio output unit is configured to output an audio output of the robot 104. The expression output unit is configured to output one or more expressions of the robot 104. The robot control system is configured to control a movement of the robot 104 by analyzing the audio output and the one or more expressions of the robot 104. The movement of the robot 104 may be any of, but not limited to, moving arms or legs of the robot 104, and moving in any of a forward movement, a backward movement, a left-side movement or a right-side movement.

Figure 2:
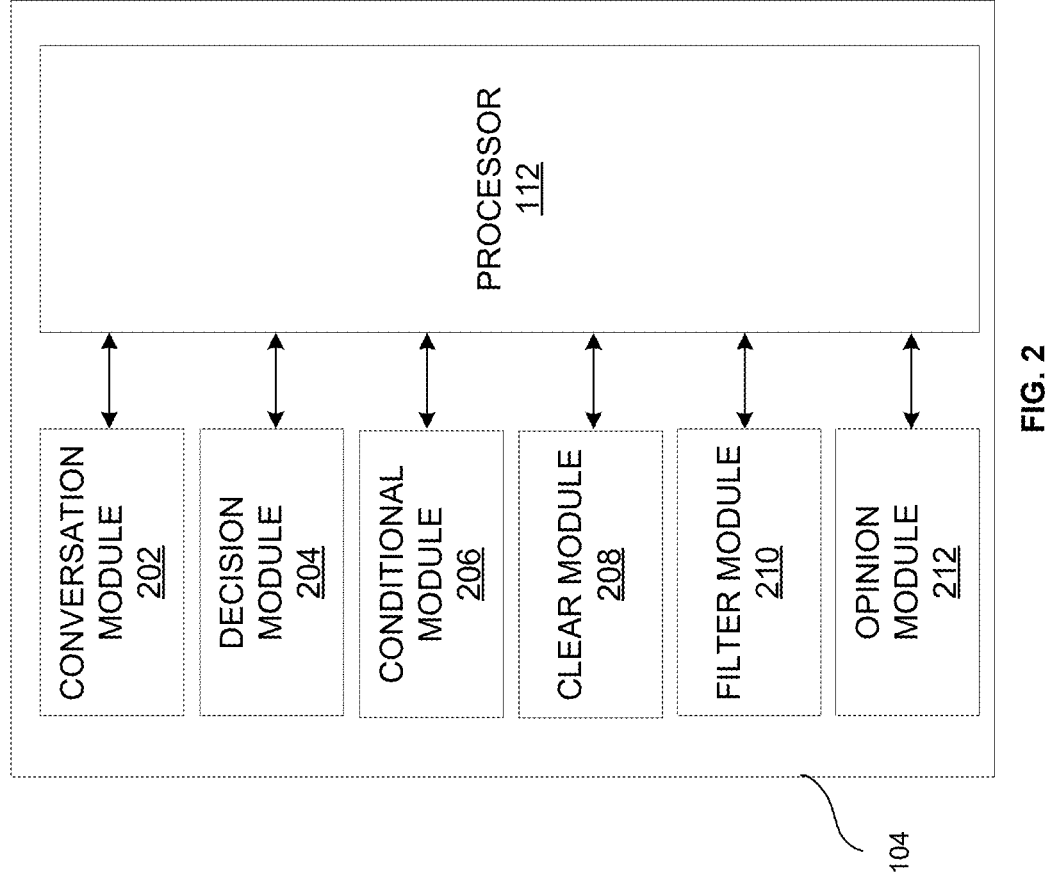
FIG. 2 illustrates a block diagram of the robot according to some embodiments herein.

FIG. 2 illustrates a block diagram of the robot 104 according to some embodiments herein. The block diagram of the robot 104 includes a conversation module 202, a decision module 204, a conditional module 206, a clear module 208, a filter module 210, an opinion module 212, and the processor 112. The conversation module 202 is configured to initiate the conversation with the user 102. In some embodiments, the audio input unit is connected with the conversation module 202 to receive the input conversation from the user 102. The input conversation from the user 102 may be an input to the conversation module 202. In some embodiments, the robot 104 includes a speech to text module that is configured to convert the input conversation into text. In some embodiments, the robot 104 includes a voice processor that is configured to recognize the voice of the user 102. The conversation module 202 may initiate the conversation by providing one or more contents related to the user interests of the user 102. The conversation module 202 may generate the output using a robotic expression. In some embodiments, the robotic expression includes at least one of, but not limited to, moving the arms or the legs of the robot 104.

The decision module 204 is configured to determine the flow of the conversation with the user 102 by analyzing the replies of the user 102. The decision module 204 determines the flow of the conversation and redirects the flow of the conversation to another topic when the conversation with the user 102 is not relevant to the user's interests. The conditional module 206 is configured to decide the conversation to talk with the user 102 based on at least one of the parameters including user sentiments and external factors like climate, population, and demography. For example, the user sentiments may be a positive reaction or a negative reaction from the user 102. The positive reaction may be a pleasant reply, or a happy reply of the user 102. The negative reaction may be a unpleasant reply, a depressing reply, or a harmful reply from the user 102. The conditional module 206 may enable the decision module 204 to determine and redirect the flow of conversation with the user sentiments by analyzing the replies of the user 102. For example, when the user 102 has negative reaction, the conditional module 206 and the decision module 204 to enable the conversation module 202 to initiate the conversation in the one or more contents related to the user's interests. In some embodiments, the processor 112 generates the closed domain conversation by filtering the conversation with the one or more contents.

The clear module 208 is configured to clear a conversation history. In some embodiments, the clear module 208 clears the conversation module when the topic of the conversation is not relevant to the user's interest. The clear module 208 may clear the conversation history when the decision module 204 redirects the flow of the conversation to another topic. In some embodiments, the clear module 208 clears the conversation history when the user 102 is not interested to talk about the topic. The filter module 210 is configured to fetch the conversation by filtering the conversation based on at least one topic or category which is personalized based on the combination of the one or more properties of the user's interest. The filter module 210 may select a random conversation based on the multiple filtered conversation. In some embodiments, the filter module 210 connects a multiple conversation network based on one or more logical expressions in a continuous conversation network.

The opinion module 212 is configured to generate one or more opinion sets by analyzing the replies of the user 102 during the conversation. The one or more opinion sets include opinions of the user 102. In some embodiments, the one or more opinion sets include one or more opinions of one or more users. The opinions may include, but not limited to, likes and dislikes of the user 102. In some embodiments, the opinion module 212 collects information from the one or more users to form a short opinion. The opinion module 212 may learn the opinion from the user 102 based on the conversation with the user 102 and transmits the opinion to the conditional module 206 to control the flow of the conversation.

The processor 112 is configured to generate the closed domain conversation with the conversation module 202, the decision module 204, the conditional module 206, the clear module 208, the filter module 210, and the opinion module 212, and enable the user 102 to interact with the robot 104 using the closed domain conversation in real-time based on the user's interest. In some embodiments, the conversation module 202, the decision module 204, the conditional module 206, the clear module 208, the filter module 210, and the opinion module 212 are networked in one or more combinations to construct the flow of the conversation with the closed domain conversation.

Figures 3A, 3B:
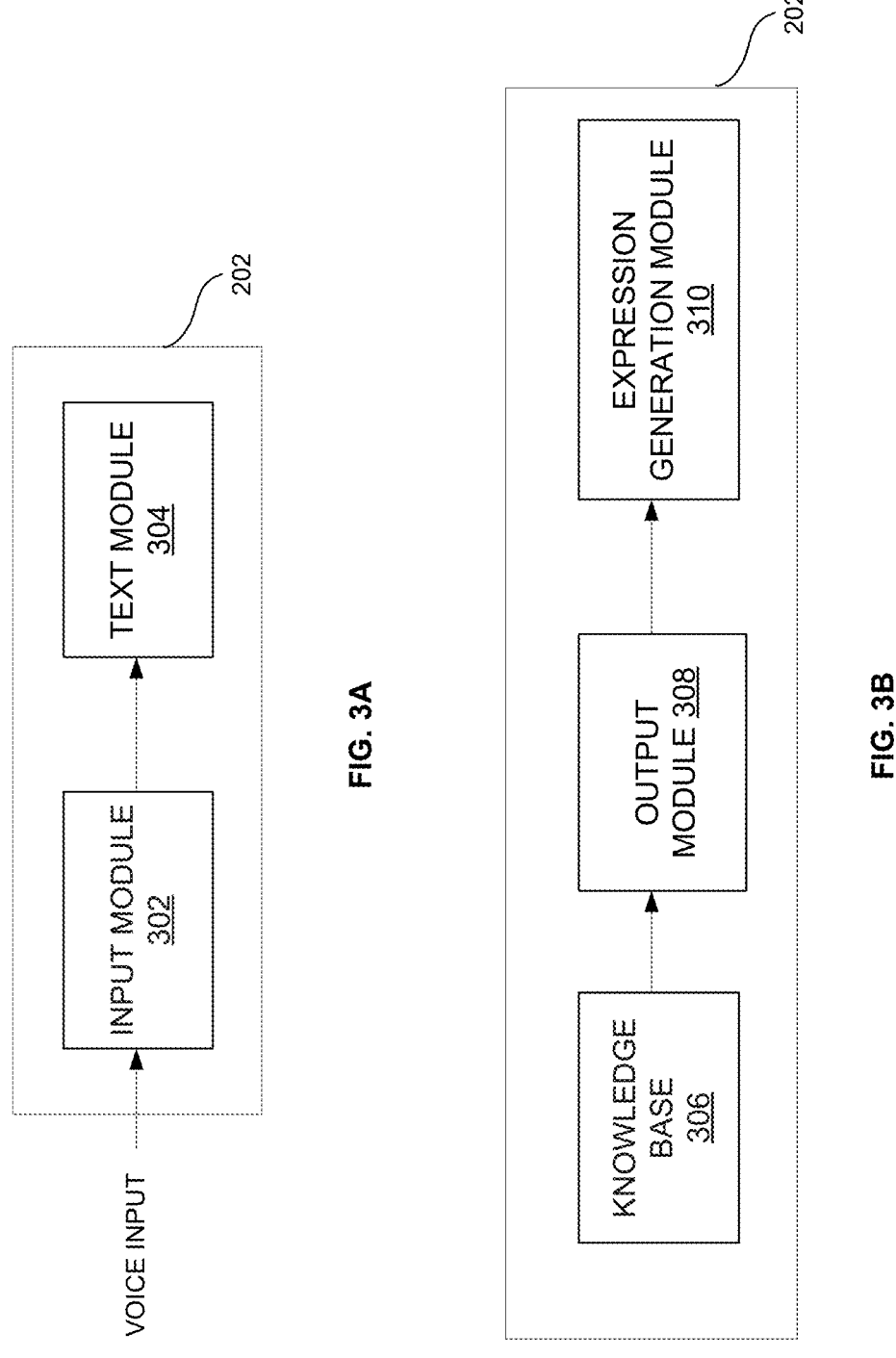
FIGS. 3A-3B illustrate block diagrams of an input section and an output section of a conversation module of FIG. 2 according to some embodiments herein.

FIGS. 3A-3B illustrate block diagrams of an input section and an output section of the conversation module 202 of FIG. 2 according to some embodiments herein. FIG. 3A shows the input section of the conversation module 202 that includes an input module 302 and a text module 304. The input module 302 receives a voice input from the user 102. In some embodiments, the voice input from the user 102 is at least one of the replies of the machine-initiated conversation or the user-initiated conversation. The input module 302 may include any of a camera, and a microphone. The text module 304 is configured to convert the voice input of the user 102 to the text. The conversation module 202 may store the voice input of the user 102 and the text of the conversation in the memory 110. FIG. 3B shows the output section of the conversation module 202 including a knowledge database 306, an output module 308, and an expression generation module 310. In some embodiments, the knowledge database 306 is the memory 110. The output module 308 is configured to generate an output to the user 102 based on the conversation. In some embodiments, the output module 308 generates the output to the user 102 by analyzing the replies of the user 102. The output module 308 may be any of a display on a screen, and a speaker. The expression generation module 310 is configured to generate one or more robotic expressions based on the output to the user 102. In some embodiments, the one or more robotic expressions are stored in the knowledge database 306. The expression generation module 310 may display the one or more robotic expressions on the screen.

Figures 4A, 4B:
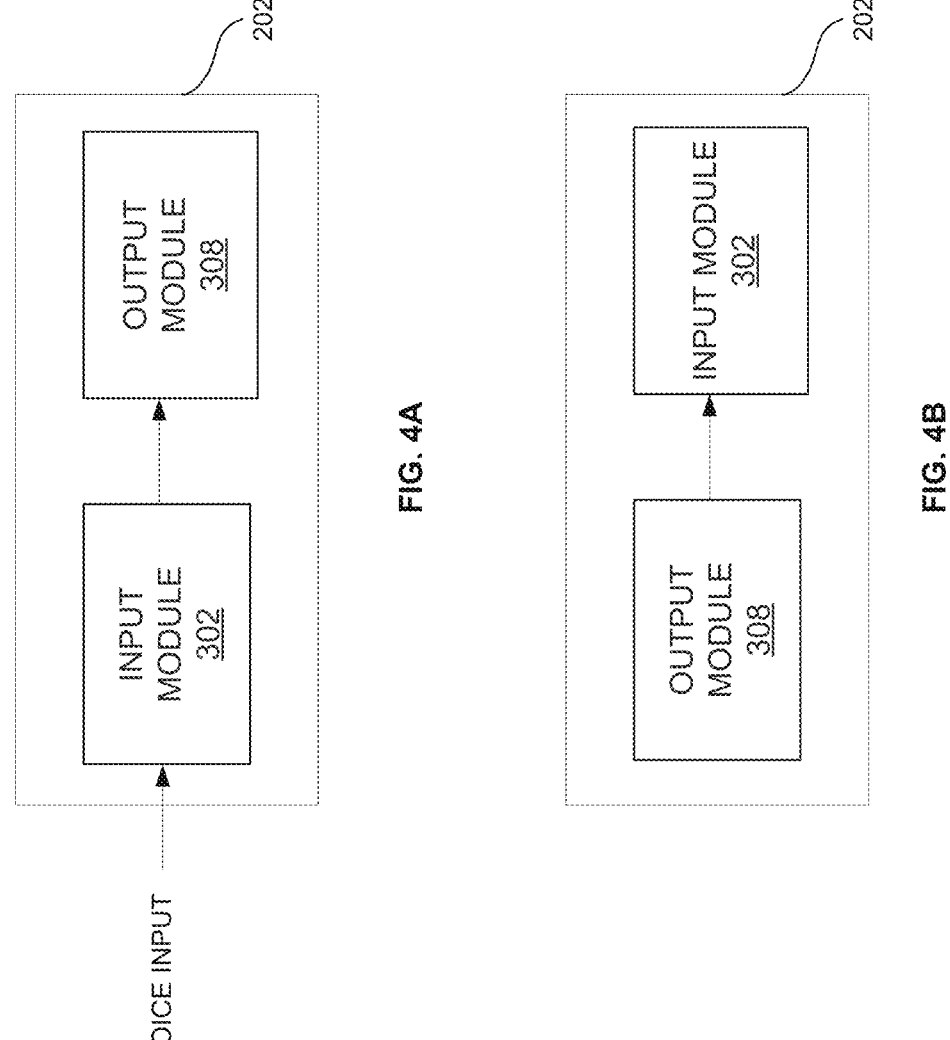
FIGS. 4A-4B illustrate block diagrams of networking of one or more micro conversations in the conversation module of FIG. 2 according to some embodiments herein.

FIGS. 4A-4B illustrate block diagrams of networking of the one or more micro conversations in the conversation module 202 of FIG. 2 according to some embodiments herein. FIG. 4A shows the conversation module 202 including the input module 302 and the output module 308 for a first micro conversation. The first micro conversation may be the user-initiated conversation. The input module 302 receives the input conversation from the user 102, processes the input conversation in the conversation module 202 to determine the output, and transmit the output to the user 102 through the output module 308. FIG. 4B shows the conversation module 202 including the output module 308 and the input module 302 for a second micro conversation. The second micro conversation may be the machine-initiated conversation. The output module 308 initiates the conversation with the user 102 on a topic based on the user's interest that are stored on the knowledge database, and receives the replies of the user 102 through the input module 302.

Figure 5:
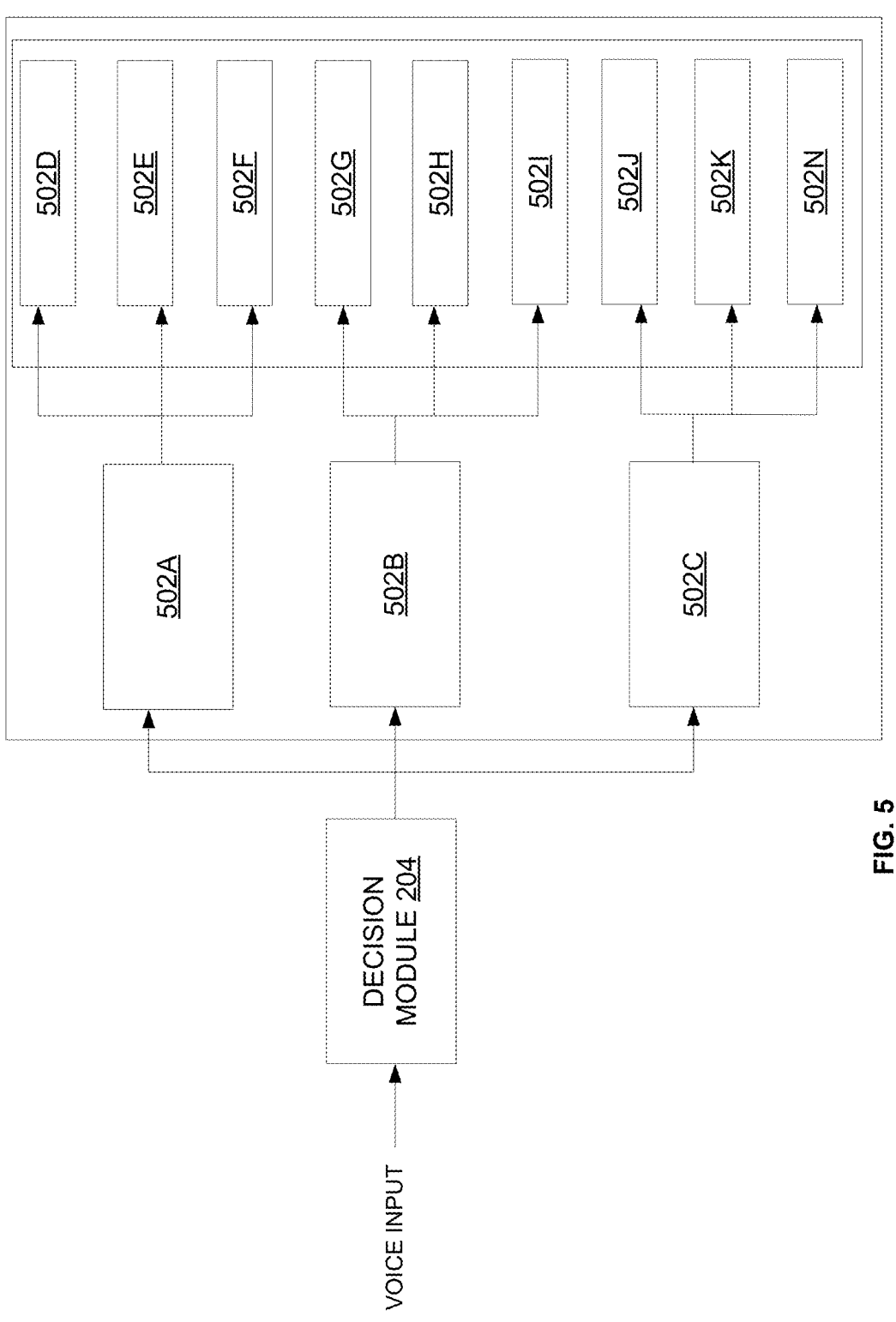
FIG. 5 illustrates a schematic diagram of transitioning of one or more micro conversations in a decision module of FIG. 2 according to some embodiments herein.

FIG. 5 illustrates a schematic diagram of transitioning of one or more micro conversations 502A-N in the decision module 204 of FIG. 2 according to some embodiments herein. The schematic diagram includes the decision module 204 and the one or more micro conversations 502A-N. The decision module 204 is configured to determine the flow of the conversation with the one or more micro conversations 502A-N. The decision module 204 may determine and redirect the flow of the conversation based on the input query, one or more parameters extracted from the input query, entity and sentiments of the user 102, cultural preferences of the user 102, the environmental factors including seasons of the location of the user 102, and the like. The entity of the user 102 may include the age, the location, the gender, the likes, and the dislikes of the user 102. The sentiments of the user 102 may be a positive reaction or a negative reaction exhibited by the user 102. The cultural preferences of the user 102 may include climate, population, and demography. The decision module 204 may transition from one micro conversation to another conversation with the one or more micro conversations 502A-N. In some embodiments, the decision module 204 transition the conversation when the conversation is not based on the user's interest. In some embodiments, various combinations of the one or more micro conversations 502A-N can be grouped to create a continuous dialogue conversation.

Figure 6A:
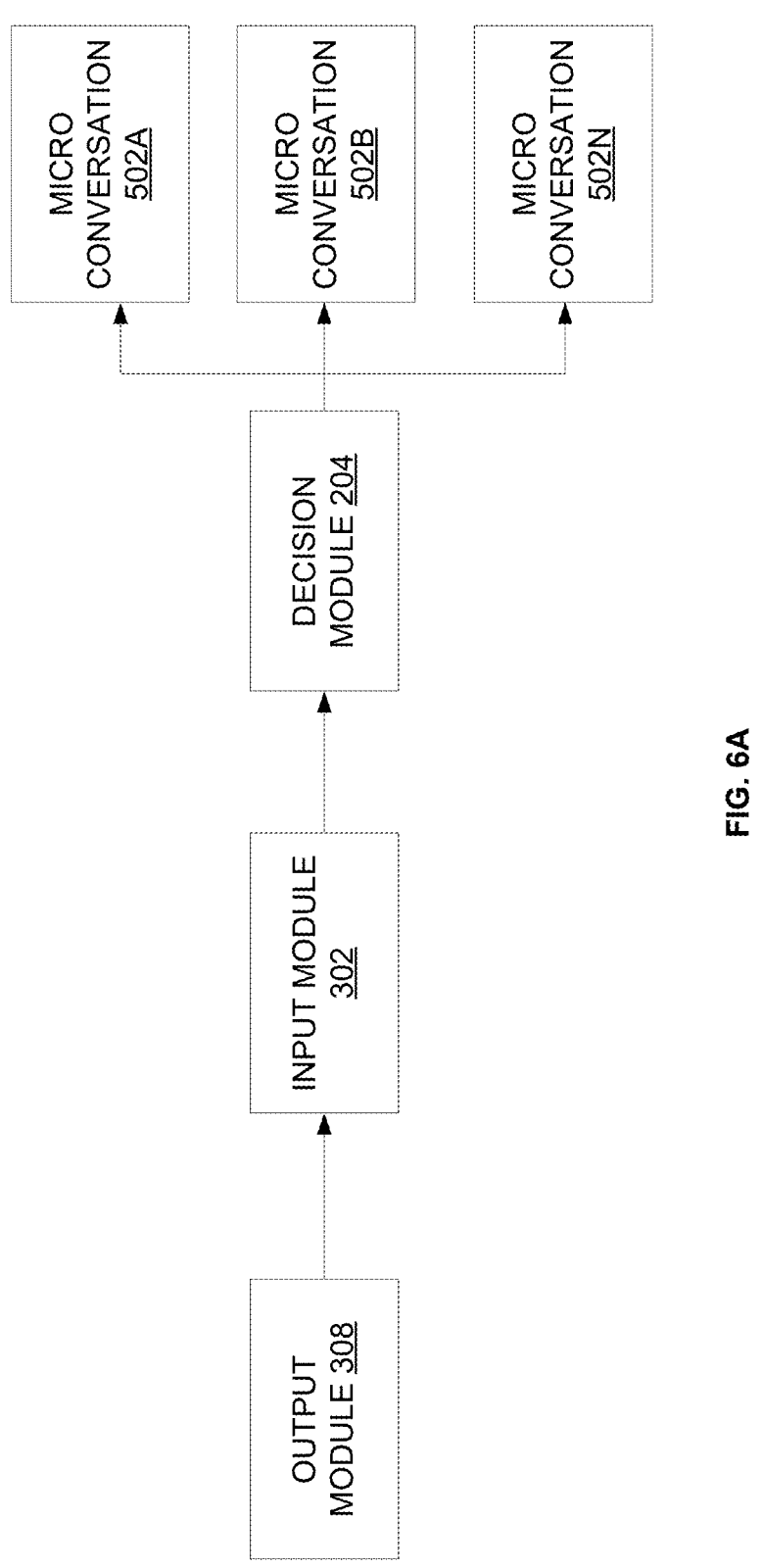
FIGS. 6A-6G illustrate schematic diagrams of a flow of the conversation with the user according to some embodiments herein.

FIGS. 6A-6G illustrate schematic diagrams of the flow of the conversation with the user 102 in accordance with the embodiments herein. FIG. 6A shows a schematic diagram of the decision module 204 that controls the flow of the conversation based on the input query and one or more parameters extracted from the input query. The schematic diagram includes the output module 308, the input module 302, the decision module 204, and the one or more micro conversations 502A-N. The output module 308 is configured to output a first micro conversation to the user 102. In some embodiments, the first micro conversation is the machine-initiated conversation. The first micro conversation may be "WHAT IS YOUR NAME?". The input module 302 is configured to input a reply of the user 102. The reply of the user 102 may be the input query or the one or more parameters extracted from the input query. The reply of the user 102 may be a second micro conversation. The second micro conversation may be "MY NAME IS RAM". The decision module 204 receives the first micro conversation and the second micro conversation from the input module 302 and the output module 308. The decision module 204 is configured to redirect the flow of the conversation to the one or more micro conversations 502A-N based on the reply of the user 102. The one or more micro conversations 502A-N may include any of "WHAT IS YOUR AGE?", "WHAT ARE YOU DOING?", "DO YOU LIKE WATCHING MOVIES?", and the like. Based on the replies of the user 102, the decision module 204 redirects the flow of the conversation.

Figure 6B:
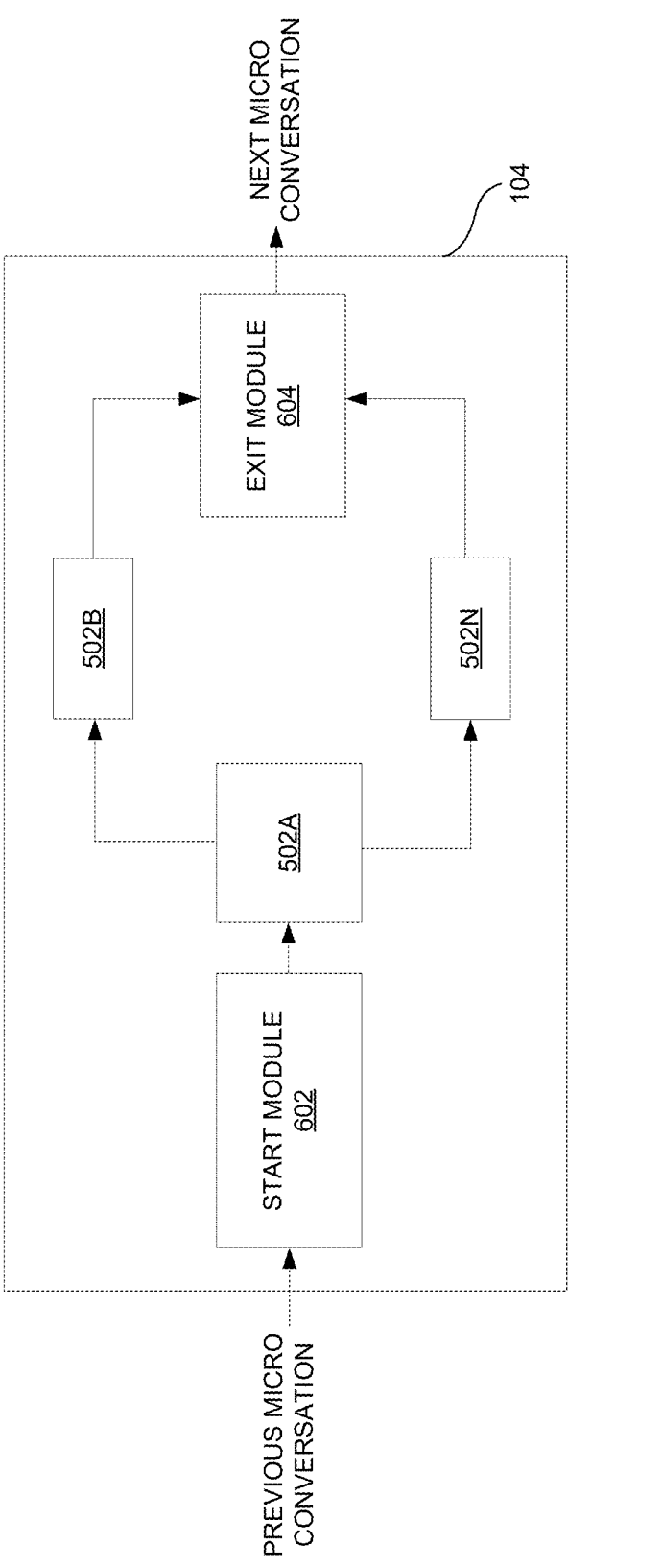

FIG. 6B shows an exemplary schematic diagram of the flow of conversation in the robot 104 in accordance with the embodiments herein. The exemplary schematic diagram includes a start module 602, the one or more micro conversations 502A-N, and an exit module 604. In some embodiments, a new conversation with the user 102 starts with the start module 602 and ends with the exit module 604. The start module 602 receives a previous micro conversation with the user 102. The previous micro conversation may be "MY NAME IS RAM" from the user 102. The start module 602 inputs the previous micro conversation as a first micro conversation 502A, and checks for the next micro conversation from the one or more micro conversations 502B-N. The one or more micro conversations 502B-N may include any of "THAT'S GREAT TO HEAR", "GOOD NAME", and the like. The one or more micro conversations 502B-N are connected with the exit module 604, which exits and ends the conversation with the user 102, and the robot 104 initiates a new conversation with the user 102.

Figure 6C:
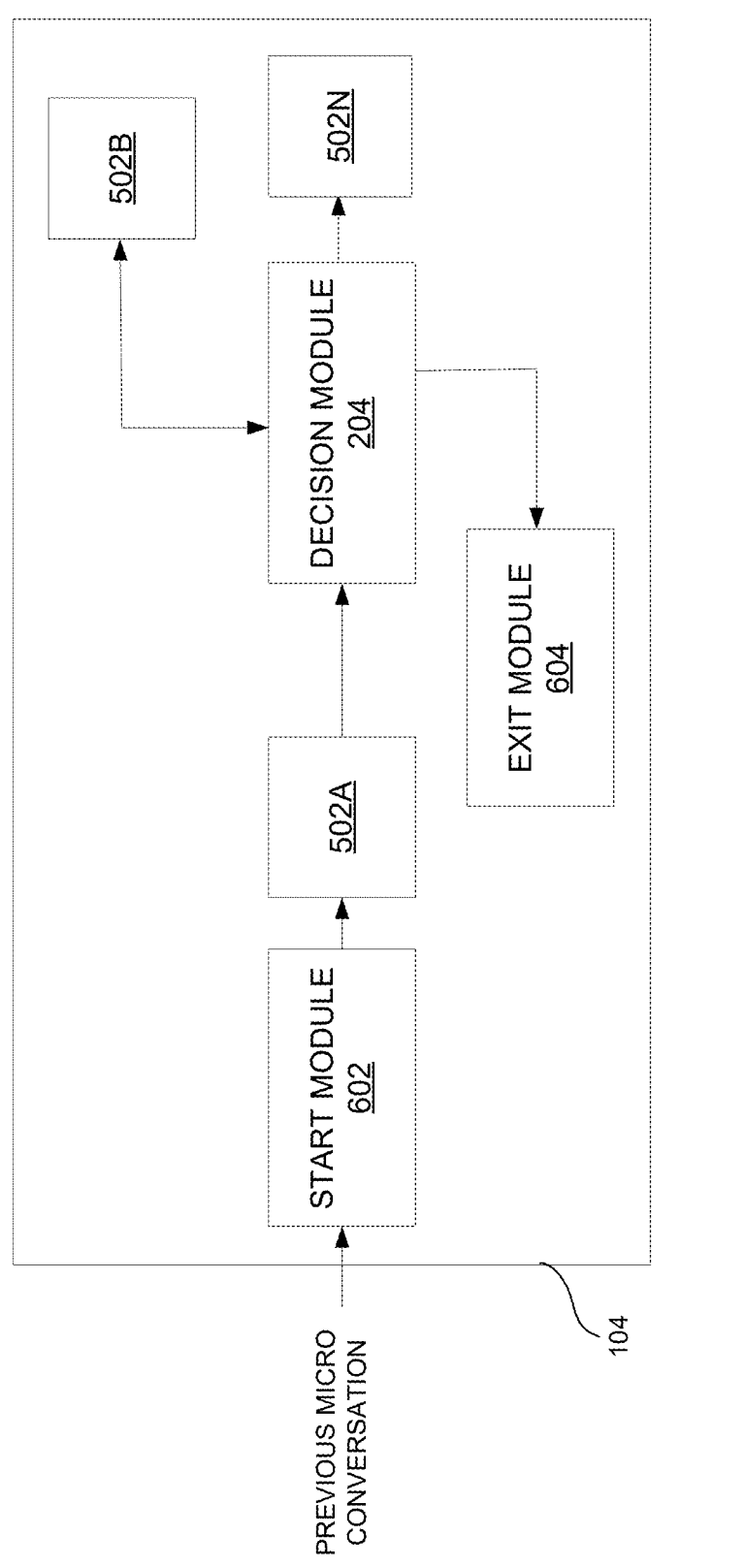

FIG. 6C shows an exemplary schematic diagram of the flow of conversation in the robot 104 with the decision module 204 in accordance with the embodiments herein.

The exemplary schematic diagram includes the start module 602, the one or more micro conversations 502A-N, the decision module 204, and the exit module 604. In some embodiments, the one or more conversations 502A-N may not be connected to the exit module 604. The start module 602 receives a previous micro conversation with the user 102. The previous micro conversation may be "MY NAME IS RAM" from the user 102. The start module 602 inputs the previous micro conversation as a first micro conversation 502A, checks for the next micro conversation from the one or more micro conversations 502B-N, and outputs a second micro conversation 502B to the user 102. The second micro conversation 502B may be any of "THAT'S GREAT TO HEAR", "GOOD NAME", and the like. The second micro conversation 502B inputs to the decision module 204 as the second micro conversation 502B is not connected to the exit module 604. The decision module 204 is configured to select the one or more micro conversations 502B-N to change the flow of the conversation or to end the conversation with the user 102, with the exit module 604. The robot 104 may initiate a new conversation with the user 102.

Figure 6D:
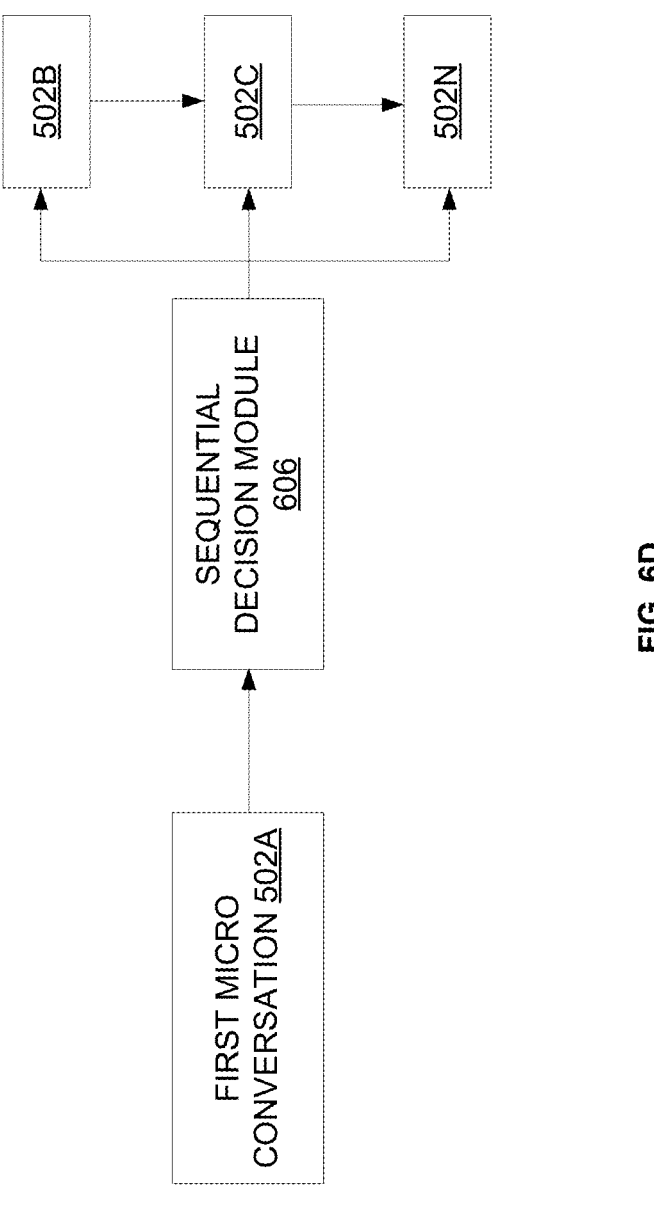

FIG. 6D shows a schematic diagram of the flow of conversation with the user 102 in a sequential order in accordance with the embodiments herein. The schematic diagram includes a sequential decision module 606, and the one or more micro conversations 502A-N. The sequential decision module 606 receives a first micro conversation 502A and is configured to process the flow of the conversation in the sequential order with the one or more micro conversations 502B-N.

Figure 6E:
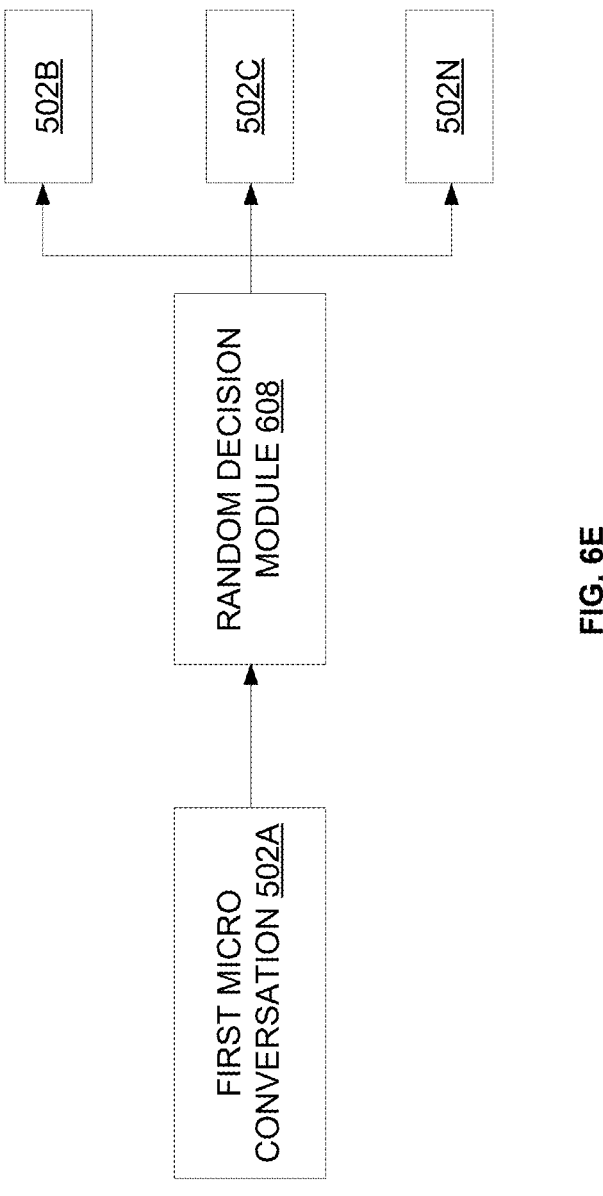

FIG. 6E shows a schematic diagram of the flow of conversation with the user 102 in a random order in accordance with the embodiments herein. The schematic diagram includes a random decision module 608, and the one or more micro conversations 502A-N. The random decision module 608 is configured to select and output one micro conversation from the one or more micro conversations 502B-N in the random order, based on the previous micro conversation. In some embodiments, the previous micro conversation is the input from the user 102. The random decision module 608 may include a probability function to select the one or more micro conversations 502B-N in the random order. In some embodiments, a process of selecting the one or more micro conversations 502B-N is continued until a maximum count of N.

Figure 6F:
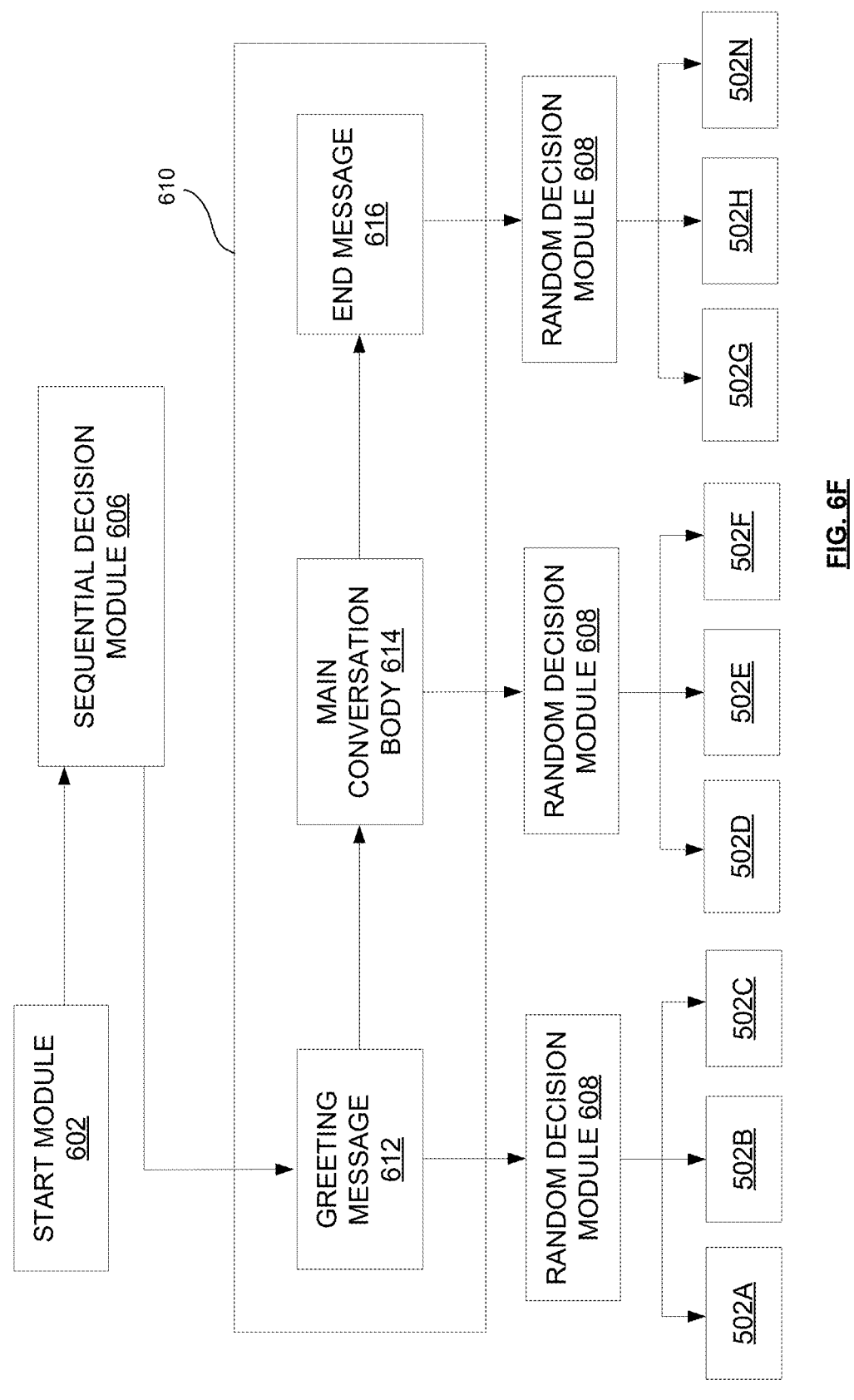

FIG. 6F shows a schematic diagram of the flow of conversation with the user 102 using the sequential decision module 606 and the random decision module 608 in accordance with the embodiments herein. The schematic diagram includes the start module 602, the sequential decision module 606, the random decision module 608, and a conversation flow 610. The conversation flow 610 includes a greeting message 612, a main conversation body 614, and an end message 616. In some embodiments, the end message 616 is a good-bye message. The conversation flow 610 may be with the greeting message 612, the main conversation body 614, and the end message 616, in the sequential order with the sequential decision module 606. The conversation flow 610 may be with the greeting message 612, the main conversation body 614, and the end message 616, in the random order with the random decision module 608. In some embodiments, the greeting message 612, the main conversation body 614, and the end message 616 include the one or more micro conversations 502A-N. The greeting message 612 may include micro conversations of "GOOD MORNING", "WHAT A PLEASANT MORNING WE HAVE", "HOPE YOU ARE DOING WELL", and the like.

The main conversation body 614 may include micro conversations of one or more topics based on the user's interest. The one or more topics may be based on the likes of the user 102. The end message 616 may include micro conversations of "HAVE A GREAT DAY", "GOOD DAY TO YOU", "WISHING YOU THE BEST FOR THE DAY AHEAD", and the like. The micro conversations of the greeting message 612, the main conversation body 614, and the end message 616 may be connected with the random decision module 608, that enables the robot 104 to initiate the conversation with the user 102 in the real-time and human-like, without getting the same content always. In some embodiments, the random decision module 608 is configured to ensure not repeating the same flow of the conversation again. The random decision module 608 may select a complex conversation flow content randomly to generate one or more different flows of conversation.

Figure 6G:
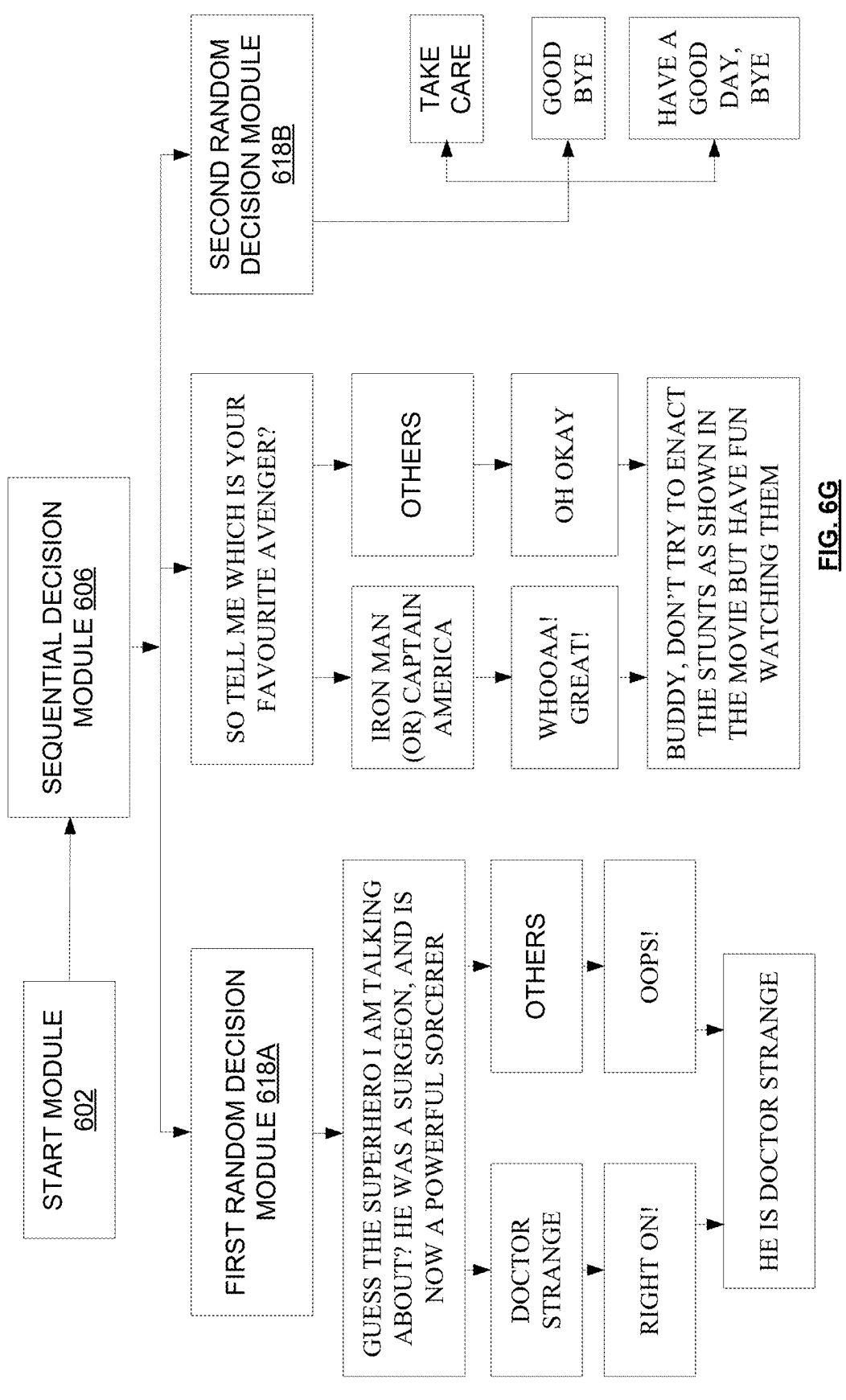

FIG. 6G shows an exemplary schematic diagram of the flow of conversation with the user 102. The exemplary schematic diagram includes the start module 602, the sequential decision module 606, a first random decision module 618A, and a second random decision module 618B. The start module 602 is configured to at least one of receive the input conversation from the user 102 or initiate the conversation with the user 102. The sequential decision module 606 is configured to initiate the conversation with a starting message, a conversation body, and an end message. The first random decision module 618A is connected with the starting message, which selects the micro conversations randomly to initiate the conversation with the user 102. For example, the starting message may be "GUESS THE SUPERHERO I AM TALKING ABOUT? HE WAS A SURGEON, AND IS NOW A POWERFUL SORCERER". If the user 102 replies with "DOCTOR STRANGE", the robot 104 replies with "RIGHT ON!", and "HE IS DOCTOR STRANGE". If the user 102 replies with some other names, the robot 104 replies with "OOPS!" and "HE IS DOCTOR STRANGE". In an instance, the starting message may be "HE IS A GOD, AND HAS A HAMMER, CAN YOU TELL ME THE NAME OF THE SUPERHERO?". If the user 102 replies with "THOR", the robot 104 replies with "YOU'VE GOT IT RIGHT!", and "THE ANSWER IS THOR". If the user 102 replies with some other names, the robot 104 replies with "OH NO!" and "THE ANSWER IS THOR". In another instance, the starting message may be "GUESS THE SUPERHERO I AM TALKING ABOUT? HE IS INCREDIBLY POWERFUL AND WHEN HE IS ANGRY, HE TURNS GREEN". If the user 102 replies with "HULK", the robot 104 replies with "WHOOAA! GREAT", and "HULK IS THE CORRECT ANSWER". If the user 102 replies with some other names, the robot 104 replies with "OH NO!" and "HULK IS THE CORRECT ANSWER".

The sequential decision module 606 moves to the conversation body. The conversation body is the main body conversation with the user 102. For example, the conversation body may be "SO TELL ME WHICH IS YOUR FAVOURITE AVENGER?". If the user 102 replies with any of "IRON MAN" or "CAPTAIN AMERICA", the robot 104 replies with "WHOOAA! GREAT!" and "BUDDY, DON'T TRY TO ENACT THE STUNTS AS SHOWN IN THE MOVIE BUT HAVE FUN WATCHING THEM". If the user 102 replies with other names, the robot 104 replies with "OH OKAY", and "BUDDY, DON'T TRY TO ENACT THE STUNTS AS SHOWN IN THE MOVIE BUT HAVE FUN WATCHING THEM". The sequential decision module 606 moves to the end message. The second random decision module 618B is connected with the end message, which selects the micro conversations randomly to end the conversation with the user 102. For example, the end message may be "TAKE CARE!", "GOOD BYE", "HAVE A GOOD DAY, BYE", and the like.

When the user 102 replies with the right answer, the random decision module 608 replies with "RIGHT ON!", "YOU'VE GOT IT RIGHT!", "WHOOAA! GREAT!", and the like, and when the user 102 replies with the wrong answer, the random decision module 608 replies with "OOPS!", "OH NO!", "NOPE!", and the like, enabling different flows of conversation without getting same content always.

Figure 7:
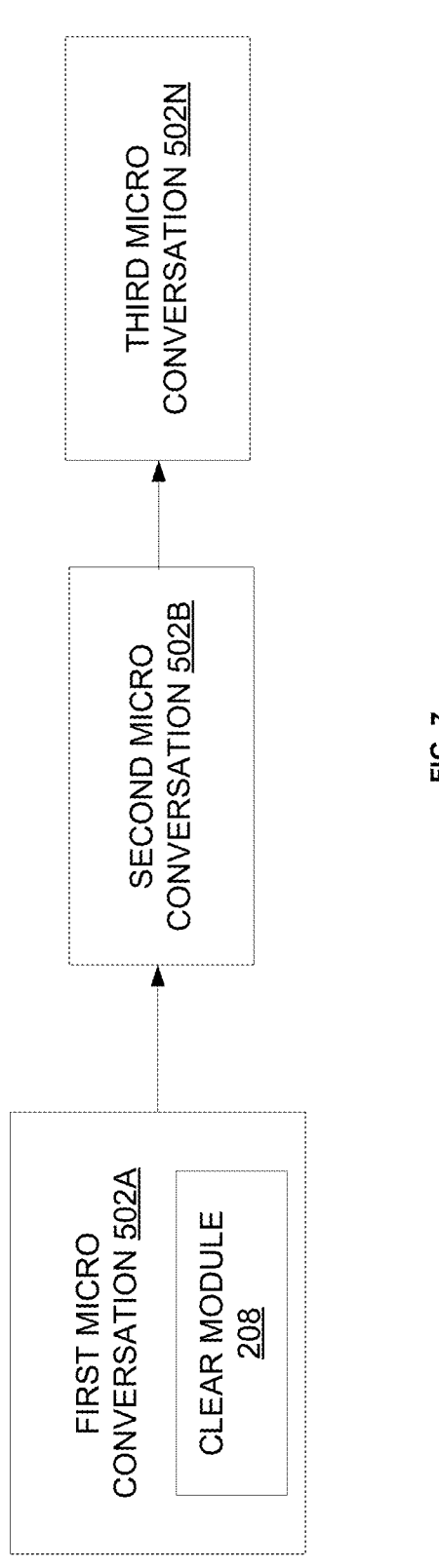
FIG. 7 illustrates a schematic diagram of a flow of conversation with a clear module of FIG. 2 according to some embodiments herein.

FIG. 7 illustrates a schematic diagram of the flow of conversation with the clear module 208 of FIG. 2 in accordance with the embodiments herein. The schematic diagram includes the clear module 208 and the one or more micro conversations 502A-N. The clear module 208 is configured to clear the conversation history with the user 102 if the conversation need not be continued by the user 102 or switching of the one or more topics to start a new conversation. The clear module 208 may clear the conversation history to change a conversation context. In some embodiments, the conversation context is the one or more topics. The clear module 208 may clear the conversation history in the conversation module 202 to change the conversation context. The conversation context may move from the first micro conversation 502A to the second micro conversation 502B, and move from the second micro conversation 502B to a third micro conversation 502N. When the third micro conversation 502N is not connected with the exit module 604, the conversation context reverts to the second micro conversation 502B and the decision module 204 reverts back the conversation context to the first micro conversation 502A. The clear module 208 may be associated with the first micro conversation 502A, and the clear module 208 clears the conversation context, and the robot 104 starts a new conversation which changes the conversation context.

Figure 8A:
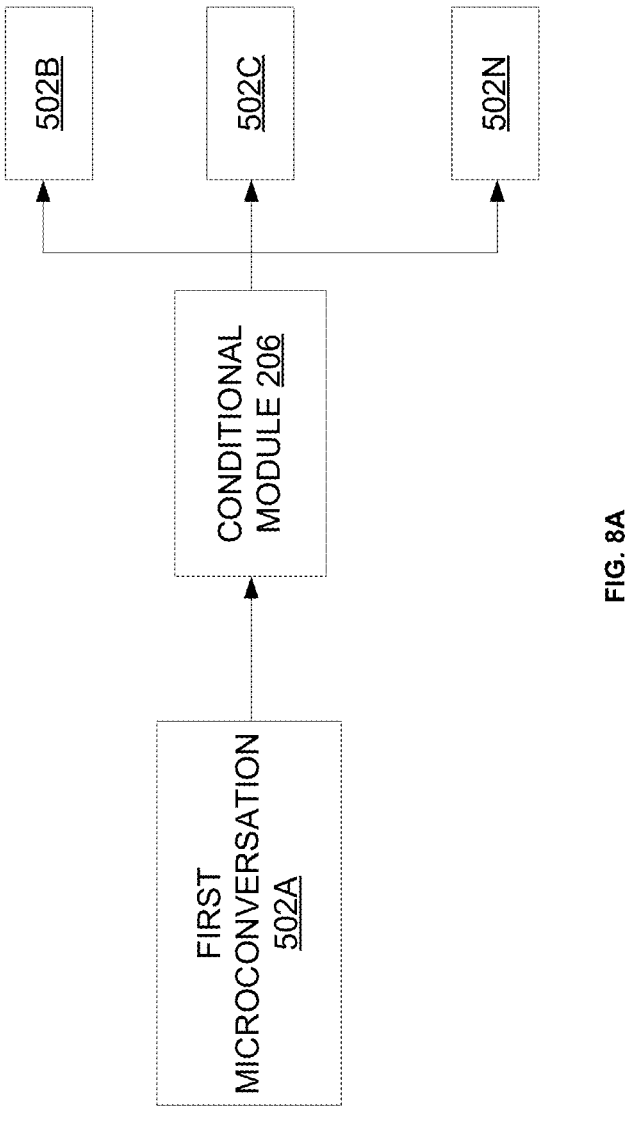
FIGS. 8A-8C illustrate schematic diagrams of a flow of conversation with a conditional module of FIG. 2 according to some embodiments herein.
Figure 8B:
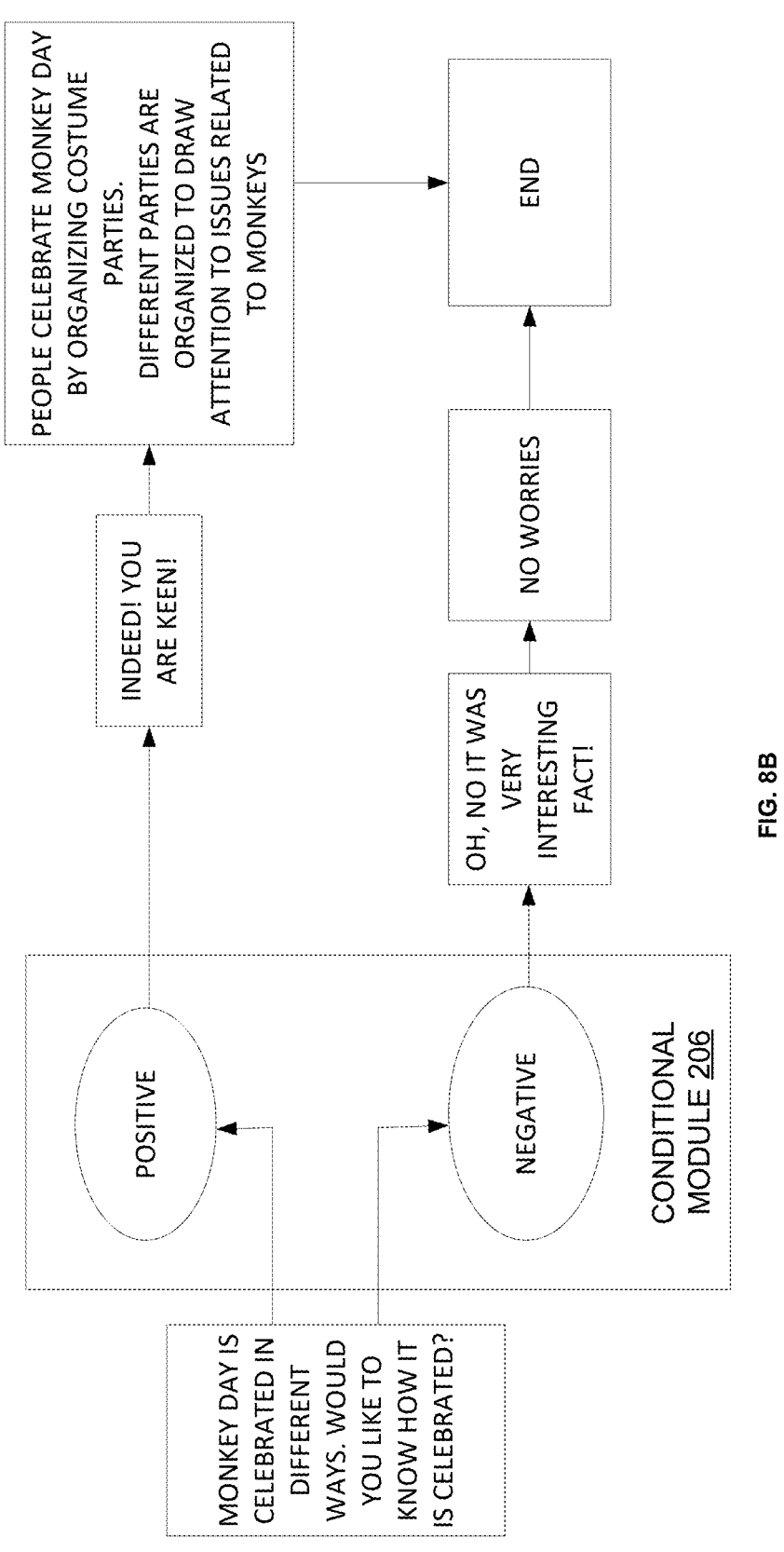
Figure 8C:
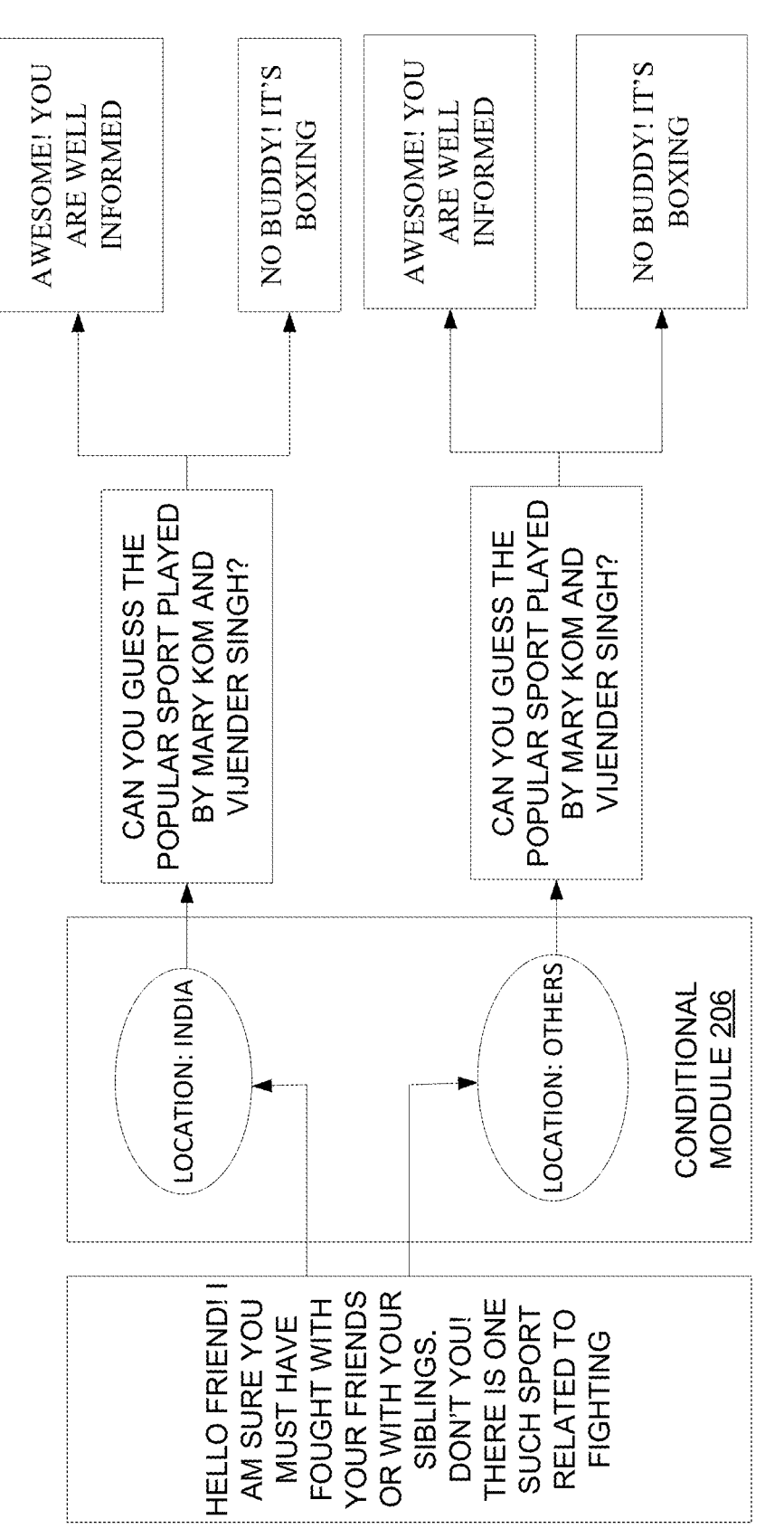

FIGS. 8A-8C illustrate schematic diagrams of the flow of conversation with the conditional module 206 of FIG. 2 according to some embodiments herein. FIG. 8A shows a schematic diagram including the conditional module 206 and the one or more micro conversations 502A-N. The conditional module 206 determines a flow of conversation within the one or more micro conversations 502A-N and across the one or more micro conversations 502A-N. The conditional module 206 determines the flow of conversation based on at least one of, but not limited to, the age, the location, the gender, the likes, the dislikes, the category of conversation, the subcategory of conversation, and entity parameters of the user 102. The entity parameters may include cultural preferences based on the location of the user 102, user sentiments, and external factors including climate, population, and demography. The conditional module 206 may determine the flow of the conversation based on any of the sentiments of the user 102, or the replies of the user 102. In some embodiments, the conditional module 206 enables initiating a conversation related to a question when the conditional module 206 receives a positive response from the user 102. In some embodiments, the conditional module 206 enables initiating a new conversation when the conditional module 206 receives a negative response from the user 102.

FIG. 8B shows a schematic diagram of the flow of conversation with the conditional module 206 using sentiment of the user 102. The schematic diagram includes the conditional module 206, the one or more micro conversations 506A-N, and the exit module 604. The one or more micro conversations 506A-N including a first micro conversation 5002A may be entered to the conditional module 206. The first micro conversation 502A may be "MONKEY DAY IS CELEBRATED IN DIFFERENT WAYS. WOULD YOU LIKE TO KNOW HOW IT IS CELEBRATED?". In some embodiments, the conditional module 206 is configured to obtain any of the audio input, and the video input of the user 102 through the input module 302. The conditional module 206 is configured to determine the flow of the conversation by determining at least one of a positive response or a negative response from the user 102. The positive response and the negative response may be determined based on the replies of the user 102. The positive response may be "OH! YEAH", "YES, I WOULD LIKE TO KNOW", "YES", and the like. The negative response may be "MMM", "HMM", "NO", and the like. If the user 102 replies with the positive response, the conditional module 206 enables the robot 104 to output a second micro conversation 502B "INDEED! YOU ARE KEEN!", and output a third micro conversation 502C "PEOPLE CELEBRATE MONKEY DAY BY ORGANIZING COSTUME PARTIES. DIFFERENT EVENTS ARE ORGANIZED TO DRAW ATTENTION TO ISSUES RELATED TO MONKEYS", and ends the conversation with the exit module 604. If the user 102 replies with the negative response, the conditional module 206 enables the robot 104 to output a fourth micro conversation 502D "OH NO, IT WAS VERY INTERESTING FACT!", and output a fifth micro conversation 502N "NO WORRIES", and ends the conversation with the exit module 604.

FIG. 8C shows a schematic diagram of the flow of conversation with the conditional module 206 using entity parameters of the user 102. The schematic diagram includes the conditional module 206, and the one or more micro conversations 506A-N. The one or more micro conversations 506A-N are connected with the conditional module 206. The first micro conversation 502A may be "HELLO FRIEND! I AM SURE YOU MUST HAVE FOUGHT WITH YOUR FRIENDS OR WITH YOUR SIBLINGS. DON'T YOU! THERE IS ONE SUCH SPORT RELATED TO FIGHTING". The robot 104 may provide Sharon bumping audio while outputting the first micro conversation 502A. The conditional module 206 is configured to check the location of the user 102. If the location of the user 102 is in India, the robot 104 outputs a second micro conversation 502B "CAN YOU GUESS THE POPULAR SPORT PLAYED BY MARY KOM AND VIJENDER SINGH?". If the user 102 replies with a correct response, the robot 104 outputs a third micro conversation 502C "AWESOME! YOU ARE WELL INFORMED". The correct response may be "BOXING". If the user 102 replies with a wrong response, the robot 104 outputs a fourth micro conversation 502D "NO BUDDY! IT'S BOXING". The wrong response may be "BADMINTON", "TENNIS", "BASKETBALL", "BASEBALL", and the like.

If the location of the user 102 is other than India, the robot 104 outputs a fifth micro conversation 502E "CAN YOU GUESS THE POPULAR SPORT PLAYED BY MOHAMAD ALI AND MIKE TYSON?". If the user 102 replies with a correct response, the robot 104 outputs a sixth micro conversation 502F "AWESOME! YOU ARE WELL INFORMED". The correct response may be "BOXING". If the user 102 replies with a wrong response, the robot 104 outputs a seventh micro conversation 502N "NO BUDDY! IT'S BOXING". The wrong response may be "BADMINTON", "TENNIS", "BASKETBALL", "BASEBALL", and the like. In some embodiments, the fourth micro conversation 502D and the seventh micro conversation 502N can be connected with the exit module 604, that ends the conversation with the user 102.

Figure 9:
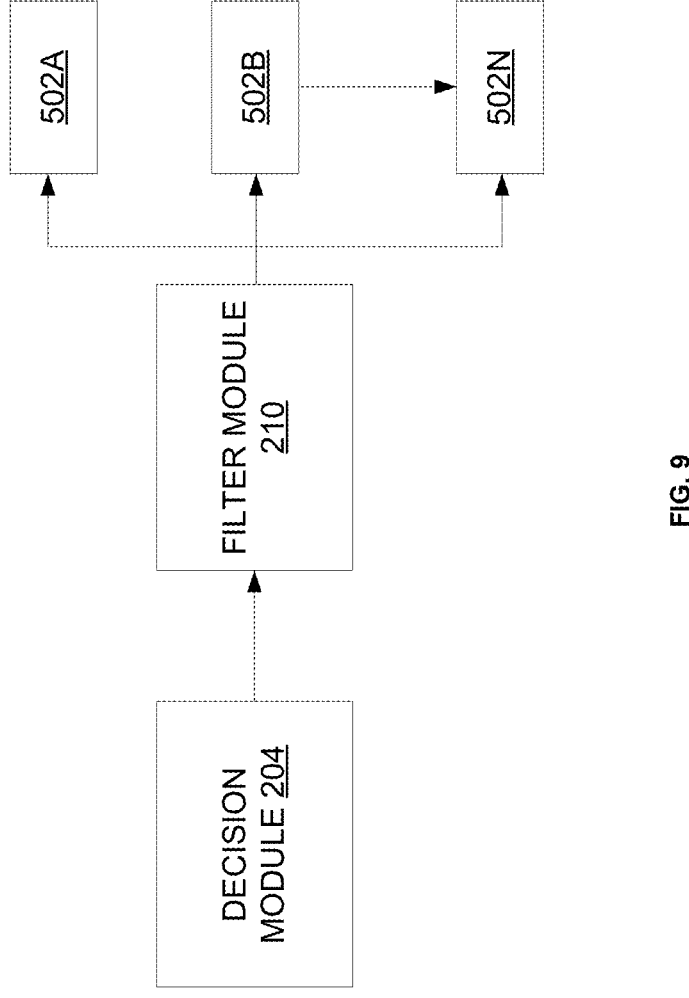
FIG. 9 illustrates a schematic diagram of a filter module of FIG. 2 according to some embodiments herein.

FIG. 9 illustrates a schematic diagram of the filter module 210 of FIG. 2 according to some embodiments herein. The filter module 210 is configured to filter the conversations based on at least one of but not limited to the age, the location, the gender, the likes and the dislikes of the user 102, the category of conversation, and the subcategory of conversation with the user 102. The filter module 210 may connect one or more multiple conversation networks based on logical expressions for a continuous conversation network. In some embodiments, the one or more multiple conversation networks include the one or more micro conversations 502A-N that filters on the filter module 210 to obtain multiple filtered conversations on specific topics or categories that are personalized based on the combination of the one or more properties of the user's interest. The filter module 210 is configured to select a random conversation from the multiple filtered conversations. For example, when the user 102 is an actor, the filter module 210 is configured to initiate the conversation based on movies, cine-news, gossips, and the like. In another instance, when the user 102 is a politician, the filter module 210 is configured to initiate the conversation based on current news, political news, and the like. In another instance, when the user 102 is an actor and the user initiate a conversation about a political content, the filter module 210 may generate conversations based on current news, political news, and the like, which is based on the user's interest. In another instance, when the user 102 is a politician, the filter module 210 may generate conversations based on movies, cine-news, gossips, and the like, which is based on the user's interest.

The schematic diagram shows the filter module 210 with the age of the user 102 as the parameter. The schematic diagram includes the decision module 204, the filter module 210, and the one or more micro conversations 502A-N. The decision module 204 is configured to provide a condition for the parameter. The parameter may be the age of the user 102. The condition may be 10 years or below 10 years. The filter module 210 is configured to process the condition from the decision module 204 and filter the one or more micro conversations 502A-N based on the condition for the parameter.

Figure 10:
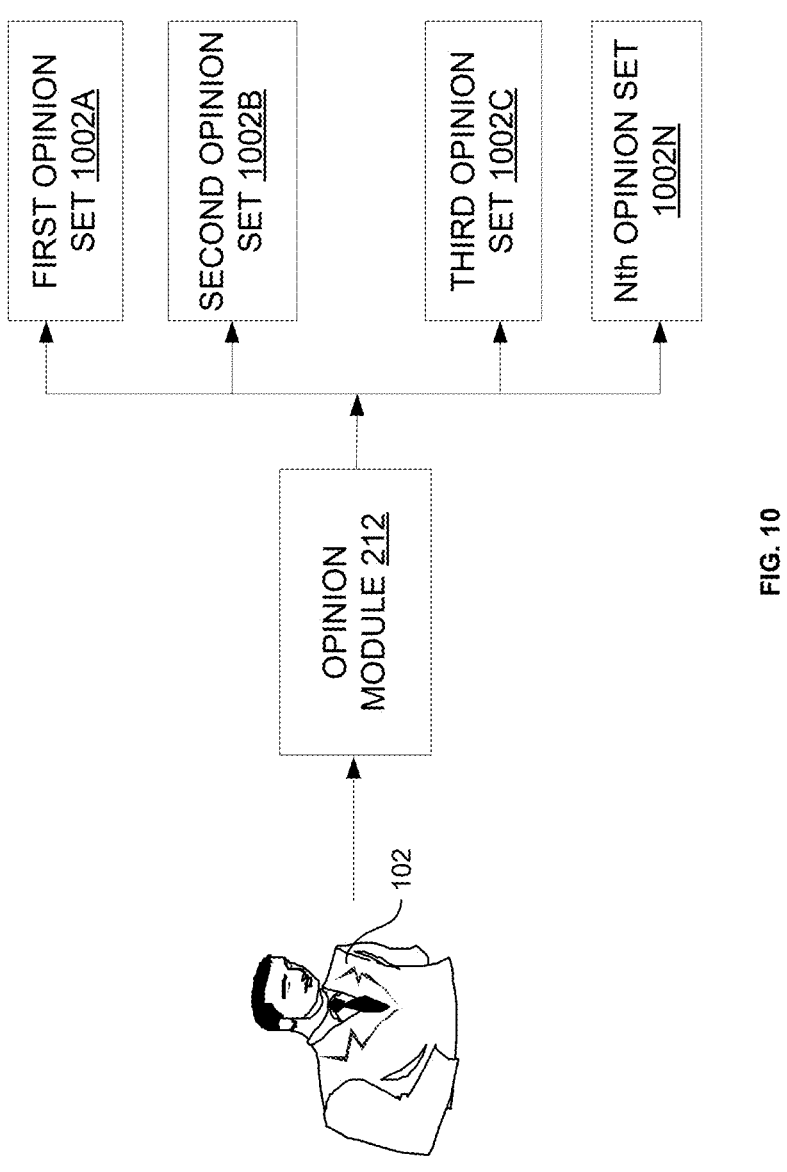
FIG. 10 illustrates a schematic diagram of an opinion module of FIG. 2 according to some embodiments herein.

FIG. 10 illustrates a schematic diagram of the opinion module 212 of FIG. 2 according to some embodiments herein. The schematic diagram includes the user 102, the opinion module 212, and one or more opinion sets 1002A-N. The opinion module 212 is configured to generate the one or more opinion sets 1002A-N during a period of conversation with the user 102. The opinion module 212 is configured to segment the opinions based on the one or more parameters. The opinion module 212 may generate the one or more opinion sets 1002A-N based on any of the age, the gender, or the location of the user 102. In some embodiments, the opinion module 212 generates the one or more opinion sets 1002A-N based on one or more users. The one or more opinion sets 1002A-N may include, but not limited to, likes and dislikes of the user 102. The opinion module 212 may generate a short opinion from the one or more users. The robot 104 processes the one or more opinion sets 1002A-N to generate the continuous conversation. In some embodiments, the robot 104 provide popular opinions to the user 102 based on the opinions from the one or more users.

In some embodiments, the robot 104 includes a guided module for generating a conversation with in-depth knowledge of a specific ontology branch to communicate with the user 102. The guided module may be created using ontology conversation structure. The guided module may be used for, but not limited to, education. For example, parents can choose the guided module for providing guided conversation topics from an ontology conversation network, and the robot 104 enables communicating all subcategories of the ontology conversation to a child. The guided module may provide a feedback to the parents through a user device on amount of knowledge gained by the child. In some embodiments, the guided module can be used for guided learning and assessment. The guided module may be used to provide in-depth knowledge of a particular branch in the ontology conversation network based on the user preference.

FIG. 11 illustrates a method of generating a closed domain conversation with the user 102 in real-time based on the user's interest according to some embodiments herein. At a step 1102, the conversation is initiated with the user 102. The conversation includes the machine-initiated conversation. The conversation includes the one or more micro conversations 502A-N pre-determined in the memory 110. At a step 1104, the flow of the conversation is determined with the user 102 by analyzing the replies of the user 102. The processor 112 determines and redirects the flow of the conversation with any of the input query or the one or more parameters extracted from the input query, the entity or the sentiments, the location of the user, or the environmental factors from the replies of the user 102. At a step 1106, the closed domain conversation is generated by providing one or more contents related to at least one topic or category which is personalized based on the combination of the one or more properties of the user's interest. At a step 1108, the user 102 is enabled to interact with the robot 104 using the closed domain conversation in the real-time based on the user's interest.

In some embodiments, the robot 104 processes the input conversation using the filter module 210 and based on the decision of the filter module 210, the conversation can continue using a network of modules in one or more permutations and combinations to provide the real-time closed domain experience to the user 102. The network of modules may include any of the sequential decision module 606, the random decision module 608, the conditional module 206, the exit module 604, the opinion module 212, and the clear module 208.

The system and the method of the robot 104 may learn the user preferences or categories from usage patterns and analytics of the one or more users that are classified based on the one or more parameters. The robot 104 may predict user preferences based on age, location, gender of the one or more users. In some embodiments, the robot 104 determines the user preferences using a combination of a first process and a second process.

The first process includes a personalized user preference matrix that is determined using a conversation engagement score. If the conversation is completed by the user 102 on a specific category initiated by the robot 104, the conversation engagement score is incremented by one, as the user 102 is interested in the category of the conversation. If the conversation is not completed by the user 102 on a specific category initiated by the robot 104, the conversation engagement score is decremented by one, as the user 102 is not interested in the category of the conversation. In some embodiments, the conversation engagement score is decremented by one, if the user 102 exits the conversation without replying to the robot 104. The robot 104 may initiate the conversation randomly to the user 102 initially and based on the replies of the user 102 on the conversation, the conversation engagement score of a user category matrix is updated. The user category matrix is based on the conversation with the one or more users. In some embodiments, the user category matrix is a final user preference matrix. For example, let $R_A$ be the user preference matrix calculated with respect to age, $R_{A\text{-}A\times M}$ which is a matrix of Age×Topics of Interest of the user, $R_B$ be the user preference matrix calculated with respect to location, $R_{B\text{-}B\times M}$ which is a matrix of Location×Topics of Interest of the user, $H_{A\text{-}A\times 1}$ be identity matrix which has value 1 for age corresponding to the user age and zeros in other positions, $H_{B\text{-}B\times 1}$ be identity matrix which has value 1 for the location corresponding to the user location and zeros in other positions. The combined user preference with respect to parameters of age and location is calculated which may be represented as, $R_U = R_A \cdot H_{A} + R_B \cdot H_B$.

The second process includes a global biased preference matrix that is calculated from the one or more users based on a combination of the one or more properties but not limited to age, gender, location, time, etc., of the one or more users, to aggregate the personalized user preference matrix over the one or more users. The global biased preference matrix is calculated for N number of users which may be represented as, $R_G = 1NR_A \cdot H_A + R_B \cdot H_B$.

The final user preference matrix is computed by combining the user personalized preference matrix and the global biased preference matrix which may be mathematically represented as, $R = R_U + R_G$. When the user interaction with the robot 104 increases, the global biased preference matrix used for the calculation of user preference may be decreased exponentially, which may be represented as, $R = R_U + R_{Ge\text{-}An}$, where n is a variable related to the usage of the system and the method by the user 102. In some embodiments, when the value of n is infinity, the global biased preference matrix reduces to zero and the preference value can be dominated by the individual user preference.

In some embodiments, the user personalized preference matrix considers the recent of activities performed by the user 102 and the user's interest with respect to a timeline. In the process of personalized user preference matrix calculation, preference values of older activities of the user 102 may be decreased and the recent activities are given more weightage than the older activities. Most recent activity may include a higher weightage in the process of the personalized user preference matrix calculation. For example, the preference matrix calculation may be represented by, $R_{UT} = R_{1e\text{-}A(NZ\text{-}N1)} + R_{2e\text{-}A(NZ\text{-}N2)} + R_Z$, where $R_1$ be the preference matrix during time slot 0-N1, $R_2$ be the preference matrix during time slot N1-N2, and NZ be a recent time slot. The value of N may not be limited to time in seconds, minutes, hours, days, weeks, months, and the like. The preference matrix calculation of N number of users may be represented by, $R_{GT} = 1NR_{1e\text{-}A(NZ\text{-}N1)} + R_{2e\text{-}A(NZ\text{-}N2)} + R_Z$, where recent preference matric values may be given more weightage than older preference matrix values.

In some embodiments, the user preferences can be computed by manipulating the personalized user preference from the personalized user preference matrix calculation, a personalized user preference over a particular timeline, the global biased user preference from the global biased preference matrix, and a global biased user preference over a particular timeline. The mathematic expression of the manipulation may be represented as, $R = R_{UT} + R_U + R_{GT} + R_{Ge\text{-}aN}$.

In some embodiments, the user preference can be computed based on session preference that enables the robot 104 not to repeat the same category of conversation in a specific timeline or session. The session may be a range from seconds, to minutes, to hours or days, and the like. The session preference may be computed by updating the personalized preference value to a negative score if the conversation happened within a specific session is to ensure the conversations are not repeated in the specific session. The mathematical expression for the session matrix may be represented as, $R_{S=A\ B\ C}$. For example, if a conversation A has been completed by the user 102 during a particular session, then a value of the session matrix of A is updated to minus infinity, which may be represented as, $R_{S=\infty B\ C}$. The preference value for the present session may be calculated with the mathematical expression, $R_S = R_S + R$.

In some embodiments, the robot 104 includes a category transition preference matrix for enabling the robot 104 to provide the conversations with the user 102 on a right track. The category transition preference matrix may be computed using a first process and a second process. The first process stores the conversation flow information in a category preference matrix. The user personalized category transition matrix may be updated based on initiation and completion/abortion of a specific conversation category transition from one conversation category to another conversation category. In some embodiments, a value of the category conversation transition is incremented by one for a successful conversation transition. If the conversation transition is aborted then the value of that category conversation transition is decremented by one. The first process may determine conversation transition preferences of a specific user. For example, let M1-M2 be a conversation transition from conversation M1 to conversation M2. If the conversation is completed then the value of M1-M2 is incremented by one in a user transition matrix $T_u$. If the conversation is aborted then the value of M1-M2 is decremented by one in the user transition matrix $T_u$. The value may be stored for the one or more users to obtain a cumulative transition matrix T, which may be represented as, $T = T_u$.

The second process calculates the category transition information based on the one or more parameters of the one or more users, that provides a cumulative category transition matrix aggregated over N users, computed for various different parameters. In some embodiments, the one or more parameters includes, but not limited to age, gender, location, etc. of the one or more users. The mathematical expression of the category transition information may be represented as, $T = T_u + T_g + T_{age}$. The robot 104 computes a final conversation category transition process from one conversation to another conversation by combining the personalized category transition matrix with the cumulative category transition matrix computed for one or more different parameters. The mathematical expression for the final conversation category transition may be represented as, $T = T_u + T_g + T_{age}H_A + T_{location}H_B$, and $T = T_u + (T_G + T_{age} + T_{location})_{e\text{-}aN}$. The final conversation category transition matrix is computed by combining the personalized category transition matrix and the cumulative category transition matrix.

In some embodiments, the personalized category transition matrix considers the recent of activities performed by the user 102 and the user's interest with respect to a timeline. In the process of personalized category transition matrix calculation, preference values of older activities of the user 102 may be decreased and the recent activities are given more weightage than the older activities. Most recent activity may include a higher weightage in the process of the personalized category transition matrix calculation. For example, the personalized category transition matrix calculation may be represented by, $T_{1e\text{-}aN1+}T_{2e\text{-}AN2+} \ldots T_z$, where z is the most recent timeline.

In some embodiments, the conversation category transition preference can be computed by manipulating the personalized category transition matrix from the personalized category transition matrix calculation, a personalized category transition matrix over a particular timeline, cumulative category transition matrix, and cumulative category transition matrix over a particular timeline. The personalized category transition matrix may be computed based on session preference that enables the robot 104 not to repeat the same category of conversation transition in a specific timeline or session. The session may be a range from seconds, to minutes, to hours or days, and the like. The session preference may be computed by updating the personalized transition matrix value to a negative score if the conversation happened within a specific session is to ensure the conversations are not repeated in the specific session. In some embodiments, the conversation category transition can be calculated by combining user preference computations with the category transition computations.

In some embodiments, the robot 104 carries the conversation using a network of different types of communications in different combinations along with various computations for determining the user preferences and conversation transitions to categorize in terms of their behaviors. The conversations may behave in any of an engagement nature with an engagement module, an exploratory nature with an exploratory module or a guided nature with the guided module. The engagement module is configured to initiate active conversations based on the user preferences that are computed using the one or more parameters including the personalized user preferences, the personalized user preference over the particular timeline, the global user preference, and the global user preference over the timeline or with one or more combinations of the user preferences.

The exploratory module is configured to initiate the conversations based on categories unexplored by the user 102, in a random manner, that enables learning of latent interest or unknown preferences of the user 102. In some embodiments, unexplored conversations are determined based on a score value of the transition matrix. If the value of the transition matrix is zero, the exploratory module may imply the conversation is unexplored and any conversation category can be chosen randomly to initiate active conversation with the user 102. The random conversation may be chosen from a set of conversations with the score value is zero. For example, if the user 102 completes an exploratory conversation with the robot 104, the user preference matrix values and conversation category transition matrix values can be updated. In some embodiments, the conversation preference value is calculated by combining the user preference in an engagement behavior and user preference in exploratory behavior, where the mathematical expression may be represented as, $R=R_{engagement}R_{exploratory}P_{engagement}P_{exploratory}$.

The robot 104 may learn to use the engagement module and the exploratory module based on any of the user preferences or the conversation with the user 102. For example, if the user 102 completes more conversations using the exploratory module, the robot 104 uses the exploratory module to converse with the user 102. If the user 102 completes more conversations using the engagement module, the robot 104 uses the engagement module to converse with the user 102.

In some embodiments, the robot 104 creates an ontology of conversation network that determines the conversation network in a structure from high level categorization to lower level sub categorization in a form of a tree. The personalized user preference may be computed and the matrix may be updated at each level of the ontology. The personalized conversation category transition may be computed at each level of the ontology. In some embodiments, ontology structure enables transition of the conversation from category to sub-categories by choosing appropriate sub category among various sub-categories based on the user preference values and the conversation category transition values computed for specific sub-categories. The conversation may proceed in a path of the subcategory with the higher user preference and the conversation category transition value. In some embodiments, the conversation using the ontology structure can use the engagement module or the exploratory module. For example, the mathematical expression for the preference value for the ontology as nature and category as people, may be represented as $R=R_N \times R_P$.

In some embodiments, the conversation network follows a flattened conversation category transition structure without any ontology with one or more different subcategories listed together, where the robot 104 can transition from the conversation category to one or more sub categories. The conversation using the flattened structure may follow any of the engagement module or the exploratory module. For example, a transition matrix may be expressed considering one or more categories as, T=[Nature, Plant, Animal, Sports, . . . Weather].

In some embodiments, the ontology conversation network is used along with the flattened conversation category transition structure, that enables conversation only within the specific category. The robot 104 may enable the conversation category transition between categories a flatted structure is used to the ontology structure to create conversations between the categories. In some embodiments, the conversation ontology enables translating the user preferences between the parents and the child conversation. For example, let a conversation as M1 and M2, with sub categories M11 M12 and M21 and M22 respectively. If M11 is completed and if the conversation M21 needs to be taken up next and it is not possible with the ontology structure as conversations traverse only within the particular category. For enabling the traversing between the categories, the flattened structure may be used in combination with the ontology structure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the invention.

We claim:

1. A computer-implemented conversational robot for generating a closed domain conversation with a user in real-time based on user's interest, the computer-implemented conversational robot comprising:

a memory comprising one or more instructions and storing micro-conversation data structures, user-interest parameters, and instructions for generating a closed-domain conversation; and a processor that executes the one or more instructions, wherein the processor is configured to:

initiate a conversation with the user, wherein the conversation comprises a machine-initiated conversation;

generate an input conversation from the user in real time by capturing (i) an audio input of the user using an audio input unit of the robot and (ii) a video input of the user using a video input unit of the robot;

convert the input conversation into text;

analyze the converted text to detect one or more user-specific properties comprising at least one of: age, location, gender, likes or dislikes, sentiments derived from the input conversation, or environmental or contextual parameters;

select, from the memory or from a server communicatively connected to the robot over a wired or wireless network, a micro-conversation from a plurality of micro-conversations based on the one or more user-specific properties;

determine a flow of the conversation with the user by transitioning between the plurality of micro-conversations that evaluates the input conversation, the sentiments, or the environmental parameters;

generate, using the selected micro-conversation and the determined flow, the closed domain conversation by selecting one or more contents related to at least one topic or category which is personalized based on the user's interest;

output, through an audio output unit or an expression output unit of the robot, a conversation response comprising at least one of an audio output or a robotic expression; and in response to detecting that the conversation is not relevant to the user's interest, automatically clear stored conversation context and initiate a new conversation with updated micro-conversation selections, thereby enabling the user to interact with the robot using the closed domain conversation in real-time based on the user's interest.

2. The computer-implemented conversational robot as claimed in claim 1, wherein the processor is configured to:

generate one or more opinion sets by analyzing the conversation response of the user during the conversation, wherein the processor determines the user's interest based on at least one of user preferences, likes and dislikes of the user, wherein the one or more opinion sets enables the robot to update the user's interest and the user preferences.

3. The computer-implemented conversational robot as claimed in claim 1, wherein the processor is configured to:

determine and redirect the flow of conversation with the sentiments by analyzing the conversation response of the user; and generate the closed domain conversation by filtering the input conversation with the one or more contents.

4. The computer-implemented conversational robot as claimed in claim 1, wherein the robot comprises a robot control system that controls a movement of the robot by analyzing the audio output and the robotic expression.

5. The computer-implemented conversational robot as claimed in claim 1, wherein the processor is configured to:

receive the input conversation from the user, wherein the input conversation is a user-initiated conversation;

recognize a voice of the user to identify the user; and automatically initiate the conversation with the user by analyzing the input conversation.

6. The computer-implemented conversational robot as claimed in claim 1, wherein the processor is configured to:

control the flow of the conversation in at least one of sequential order or random order, wherein the sequential order comprises a greeting message, a main conversation body, an end message, or a goodbye message which are connected in the sequential order, wherein the random order comprises the greeting message, the main conversation body, the end message, or the goodbye message which are connected in the random order that selects the flow of the conversation randomly to generate a different flow of conversation.

7. A method for generating a closed domain conversation with a user in real-time based on user's interest, wherein the method comprises, initiating a conversation with the user, wherein the conversation comprises a machine-initiated conversation;

generating an input conversation from the user in real-time by capturing (i) an audio input of the user using an audio input unit of the robot and (ii) a video input of the user using a video input unit of the robot;

converting the input conversation into text;

analyzing the converted text to detect one or more user-specific properties comprising at least one of: age, location, gender, likes or dislikes, sentiments derived from the input conversation, or environmental or contextual parameters;

selecting, from a memory or from a server communicatively connected to the robot over a wired or wireless network, a micro-conversation from a plurality of micro-conversations based on the one or more user-specific properties determining a flow of the conversation with the user by transitioning between the plurality of micro-conversations that evaluates the input conversation, the sentiments, or the environmental parameters;

generating, using the selected micro-conversation and the determined flow, the closed domain conversation by selecting one or more contents related to at least one topic or category which is personalized based on the user's interest;

outputting, through an audio output unit or an expression output unit of the robot, a conversation response comprising at least one of an audio output or a robotic expression; and in response to detecting that the conversation is not relevant to the user's interest, automatically clear stored conversation context and initiate a new conversation with updated micro-conversation selections, thereby enabling the user to interact with the robot using the closed domain conversation in real-time based on the user's interest.

8. The method as claimed in claim 7, wherein the method comprises, receiving the input conversation from the user, wherein the input conversation is a user-initiated conversation;

recognizing a voice of the user to identify the user; and automatically initiating the conversation with the user based on the input conversation.

* * * * *